Figure 1:
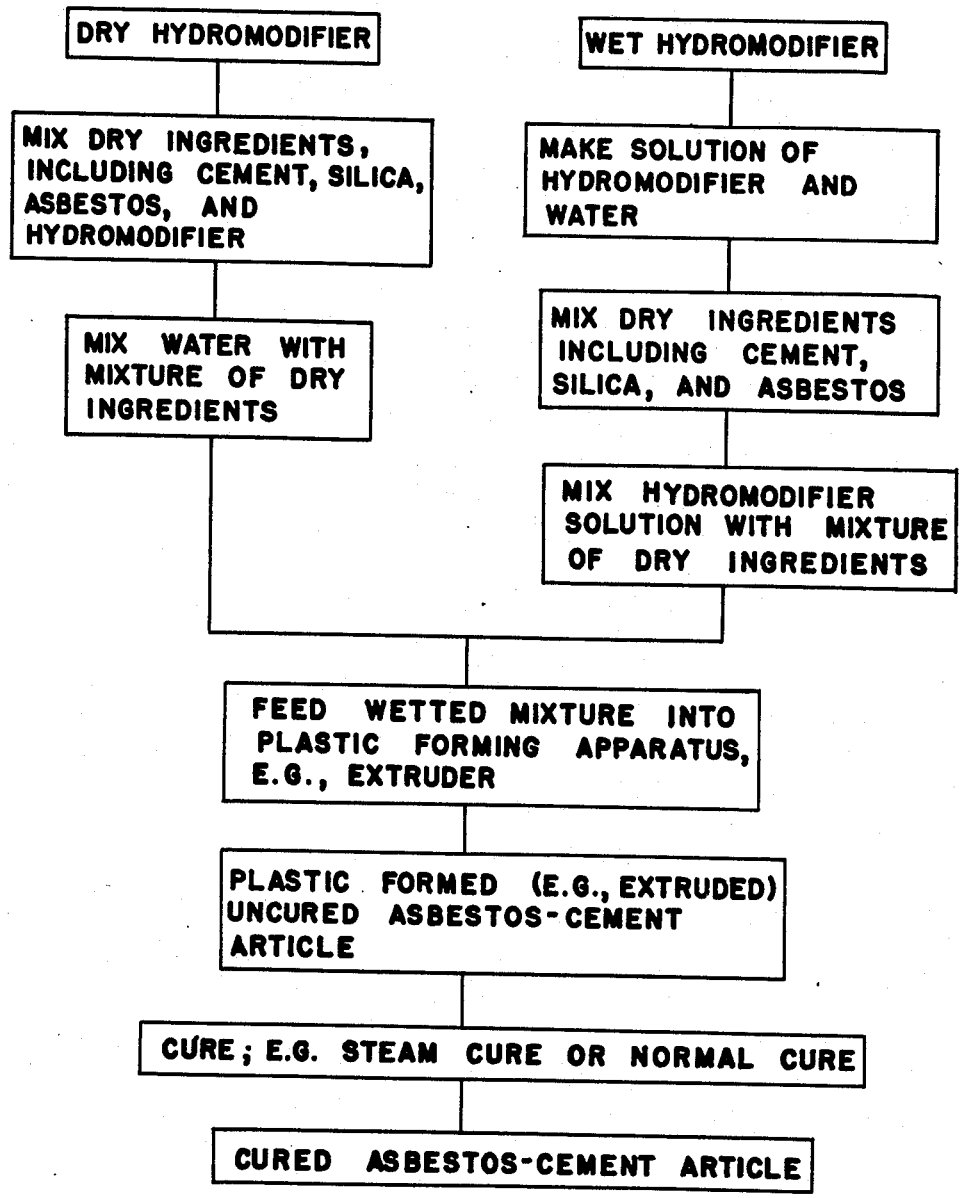

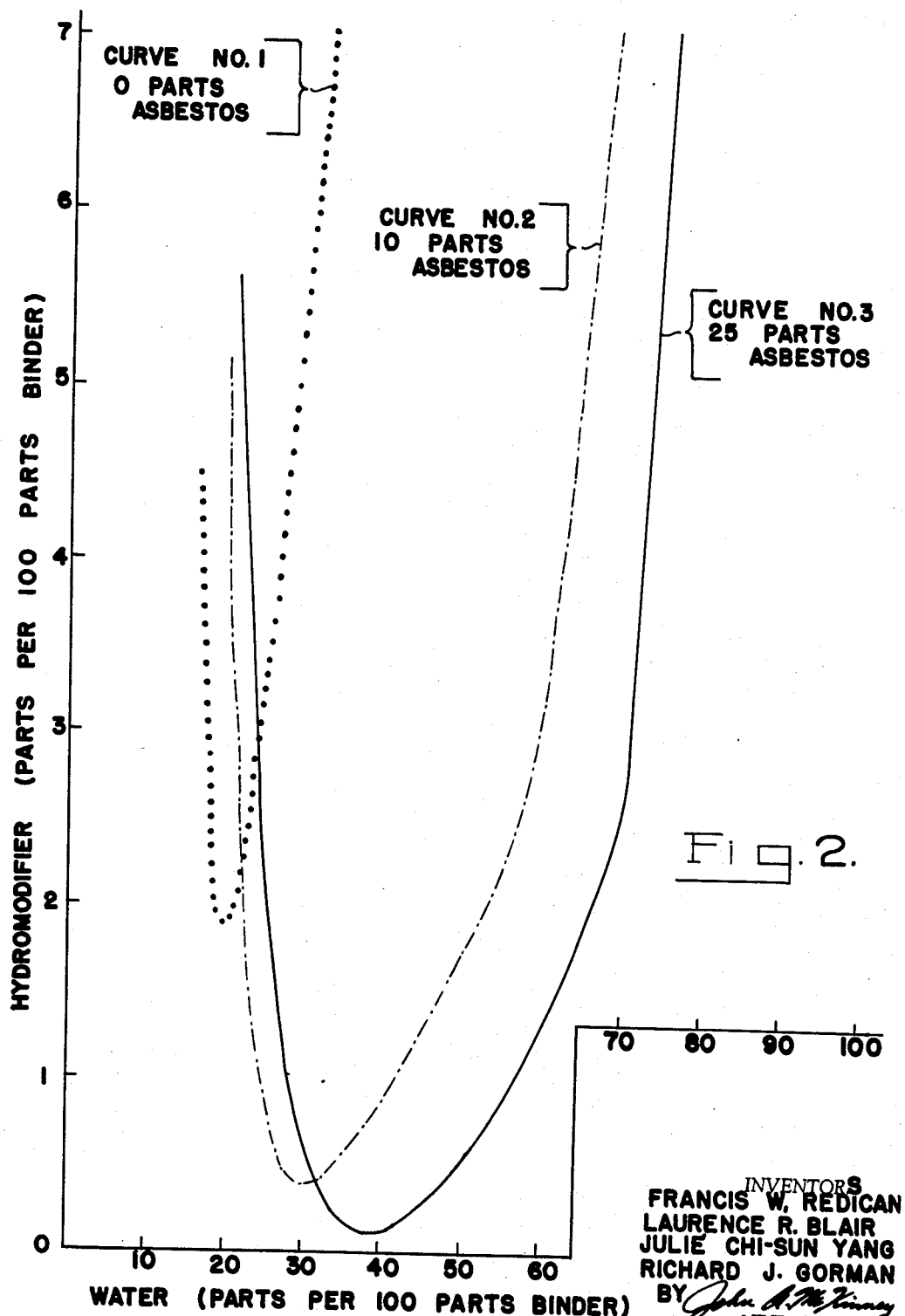

United States Patent Office 3,219,467
Patented Nov. 23, 1965

3,219,467
MANUFACTURE OF ASBESTOS-CEMENT PRODUCTS
Francis W. Redican, Houston, Tex., and Laurence R. Blair, Harding Township, Julie C. Yang, Middlesex, and Richard J. Gorman, Somerville, N.J., assignors to Johns-Manville Corporation, New York, N.Y., a corporation of New York
Filed Sept. 9, 1960, Ser. No. 54,907
8 Claims. (Cl. 106—90)

This invention relates to new asbestos-cement compositions, to methods for making new asbestos-cement compositions, to forming methods for producing shaped products therefrom, and to the resulting asbestos-cement products. The invention is particularly concerned with compositions comprising asbestos, cement and a special class of modifying additives and the plastic forming of these compositions, as by extrusion, to form pipe, sheets, and other desired extruded shapes.

*Field of the invention*

Articles made from mixtures of cement and asbestos containing from about 10 to 50% by weight of asbestos fibers are employed today in very large quantities and the manufacture and sale of these asbestos-cement articles is commercially very important. For example, asbestos-cement pipe is used in extremely large quantities in sewers, water systems, and other construction projects, because such pipe is substantially indestructible by the fluids which the pipe is used to convey, and in those conditions in which chemically aggressive media are encountered. Also, sheets and boards of the asbestos-cement type find widespread use in the building and construction industry because they are fireproof and have other desirable qualities.

Asbestos-cement pipe, boards and other products have been known and commercially used for a long time. Over the years, there has been an ever increasing demand, not only for more of such products of the standard variety, such as pipe and sheets, but also for other special shapes so that the desired properties and characteristics of asbestos-cement structures could be utilized in new applications.

Asbestos-cement products are in direct competition with other forms of construction materials, e.g., metals, plastics, wood, concrete, clay, etc., except where none of the other materials have the qualities or properties required for the special job. Accordingly, an extensive amount of research and development work has taken place in order to improve upon asbestos-cement products. This has included work designed to improve the qualities and properties of the asbestos-cement products and to decrease the manufacturing costs. Furthermore, such work has involved attempts at producing new shapes and constructions from asbestos-cement compositions in order to further expand the market for such goods.

The handling and shaping of asbestos-cement compositions presents a number of difficulties which have materially limited the general procedures used in forming products from the compositions, as well as making it commercially impracticable heretofore to produce asbestos-cement products having certain desired shapes. For example, since asbestos and cement are refractory materials, many of the shaping techniques involving fusion steps which are applied to metals and plastics have not been capable of application to the forming of asbestos-cement compositions. Likewise, since the ultimate strength of the final products is due to hydraulic cementing action, fabrication procedures must provide for this cementing action to take place during some final stage of the operation, but not prematurely, because otherwise the structural strength of the final product will be either destroyed or seriously impaired.

Reference to the refractory and hydraulic setting properties of asbestos-cement compositions hardly begins to indicate the serious problems which are encountered in the forming of these compositions. Because of the amount of water that is usually employed in compositions to provide for complete hydraulic cementing action, and because the water behaves in a peculiar fashion when mixed together with asbestos and cement in the required portions, a special problem is encountered when handling these compositions under certain conditions and which is referred to as "dewatering." This is evidenced by a pronounced tendency for the water of the mix to separate from the solids. For example, if one attempts to mold a wet mix under conditions that require any substantial amount of plastic flow, water separates from the mix when the molding pressure is applied and the mass becomes non-uniform. This has greatly limited the shape of products which can be molded from asbestos-cement compositions and also has materially reduced the production rate obtainable with a given piece of molding equipment. Because of the "dewatering" problem, it is necessary to carefully place the wet mix in the mold so that when the mold members close upon the mix, it will not have to move to any appreciable extent because, otherwise, dewatering will occur.

As will be explained later, the dewatering problem has also been a serious obstacle in extrusion and other plastic forming operations used to produce asbestos-cement products.

In addition to being troubled with "dewatering," the fabricator of asbestos-cement compositions also must concern himself with control of the product density and strength. Such properties are to some extent dependent upon the proportions of ingredients used in the wet forming mixes, but water content performs a very vital role. It is known that the larger the amount of water in the uncured shaped products, the lower will be the density of the cured final structures. This offers to the fabricator a possible method of controlling the density and strength of final cured products. However, asbestos-cement fabricators have not been able to utilize this to full advantage because the forming operations which have been available heretofore for use on a commercial scale have not allowed the fabricator to manipulate the water content of the shaped uncured product to any great extent. In other words, asbestos-cement forming techniques heretofore known would not enable the fabricator to form uncured products with a wide latitude of controlled water content, and consequently final asbestos-cement products having any great latitude in controlled density and strength could not be obtained.

In view of the peculiar limitations associated with forming and shaping of asbestos-cement compositions, commercial production of articles from such compositions has been based almost entirely on two different types of procedures which may be referred to as the "filtration process" and the "dry process." In the "filtration process," a suspension composed mostly of water and a very minor amount of the asbestos-cement composition is applied to a filter element through which the excess water is removed from the suspension, leaving on the filter element a shaped cake of the asbestos and cement mixture. The formation of pipe by the use of this general procedure is discussed in U.S. Patent 2,246,537.

In the "dry process," a substantially dry asbestos-cement composition is passed through a series of rollers which compact and shape the composition while small amounts of water are applied to moisten it. This gradual water addition and roller working finally results in the formation of the shaped, uncured asbestos-cement product. The "dry process" is discussed in U.S. Patents 2,230,880 and 2,200,267.

The "filtration process" may be used to form sheets, pipes, or other uncomplicated shapes, and, to a more limited extent, to form pipe elbows, tees and other connectors using special molds and a discontinuous batch type operation. The "dry process" is used in the production of sheet-like products, e.g., shingles, board, etc., and also pipe. However, there are many shapes and products which it would be desirable to make from cement and asbestos, but which have not been commercially produced because of the restrictions imposed by the commercially feasible asbestos-cement fabricating techniques which have been available heretofore, e.g. multi-channel conduit.

It has long been recognized that it would be very advantageous to be able to form asbestos-cement products by extrusion. The extrusion technique, if applicable to asbestos-cement compositions, would make it possible to form new products not available heretofore. At the same time, since extrusion is carried out in a generally continuous fashion, and usually at low overhead cost, the possibility of extruding asbestos-cement products is attractive from a cost viewpoint. The extrusion process involves a decided improvement economically over the "filtration process" in which excess water is first employed to form the slurry and then the excess water must be removed. With these varied and important advantages in mind, extensive research and development work has previously been undertaken by various parties in an attempt to devise commercially usable extruding procedures for asbestos-cement compositions.

Extrusion operations have long been used in the clay and pottery industries for the formation of many products, e.g., bricks, tiles, pipe, multi-channel ducts and the like. However, the procedures used in the clay and pottery industries for extrusion of clay compositions have not been applicable to the asbestos-cement industry. In the first place, an asbestos-cement slurry will "set up" due to the hydraulic cementing action, but since no such problem occurs in the handling of clay compositions, much wider latitude is available in the clay and pottery industry for carrying out clay forming operations. However, "dewatering" properties connected with asbestos-cement compositions pose a still more serious impediment which has stifled commercial use of extrusion as a forming method for asbestos-cement compositions. Thus, when an attempt is made to extrude a wet mix of cement and asbestos through an extrusion die or similar forming orifice, the pressure which must be applied to the mix and the accompanying mechanical stress immediately causes the water in the composition to segregate from the solid components. This results in compacting the solid portion of the mix so that it "freezes" into a solid, immobile mass in the extrusion die, while the water content of the mix merely runs, and sometimes actually squirts, out of the die. Consequently, no useful product is formed and the extruder is clogged with a useless mass of asbestos and cement which, if not removed from the equipment, will set up solidly within the extruder.

One approach which has been taken in an attempt to develop successful extrusion of asbestos-cement compositions has been the creation of special extrusion equipment for this purpose. A substantial number of patents have issued to cover the variety of forms of extruding equipment which apparently has come out of this research and development work. As a matter of fact, the number of patents which have issued in the past on such special extrusion equipment indicates that those previously working on this problem of asbestos-cement extrusion have considered that the most likely chance of success would be in the development of special extrusion equipment, e.g., see U.S. Patents 2,338,203; 2,344,959; 2,549,686; 2,694,-349; 2,825,955; 2,878,727 and numerous similar patents.

Since clay compositions have been successfully extruded for many years, another approach which has been taken in an attempt to extrude asbestos-cement compositions is to modify these compositions so as to make them correspond more closely to clay mixtures and thereby eliminate the problems which have been known to exist in the handling of asbestos-cement wet mixes. This approach is exemplified by the procedure described in U.S. Patent 1,977,158, wherein a substantial amount of clay is included in the asbestos-cement mix. In order to modify further the properties of the resultant extrusion composition, the patentee also suggests the use of special mixing techniques.

The use of special extrusion equipment for handling asbestos-cement wet mixes has not proved to be a satisfactory solution to the problems of dewatering, density and strength control and the like, referred to above. Fundamentally, the special extrusion equipment which has been developed attempts to overpower dewatering by "brute force." Moreover, such equipment generally does not help the fabricator to vary in a controlled fashion the amount of water present in the uncured formed product produced by the equipment. On the other hand, modification of asbestos-cement compositions in order to make them correspond more closely to clay products than to asbestos products, to a large extent, destroys some of the properties which are desired by the fabricator. Obviously, if it is necessary to include large amounts of other materials in asbestos-cement compositions in order to be able to extrude or mold them, then the final products will take on more of the properties of the added material and have less of the desired properties of the combination of cement and asbestos alone.

Objects

A principal object of this invention is the provision of new processes for plastic forming asbestos-cement compositions. Further objects include:

(1) The provision of new asbestos-cement compositions for use in plastic forming asbestos-cement products, as by extrusion.

(2) The provision of new aqueous asbestos-cement mixtures which may be successfully used to form pipes, sheets and other forms by extrusion or other plastic forming techniques without the occurrence of appreciable "dewatering."

(3) The provision of a test procedure by which it may be determined whether asbestos-cement compositions will be capable of use in plastic forming shaped products, as by extrusion, without need to employ expensive or complicated extrusion equipment of special design.

(4) The designation of a defined class of substances which may be added in small amounts to asbestos-cement compositions in order to render the compositions extrudable with standard, readily available extrusion equipment, e.g., conventional screw or ram extruders.

(5) The provision of shaped asbestos-cement products having structures, properties and other characteristics not available in asbestos-cement products known heretofore.

(6) The provision of new processes for the preparation of plastic, moist asbestos-cement mixtures and the formation of products of various shapes from such mixtures, by mechanical means, without the dewatering operations that are necesary with "filtration" processes used heretofore for the production of asbestos-cement products.

(7) The provision of new product forming operations specifically useful in the extrusion and molding of asbestos-cement compositions, but which may be useful with forming processes other than molding and extruding or with compositions other than asbestos-cement mixtures.

(8) The designation of a defined class of substances which may be added in small amounts to asbestos-cement compositions in order to render the compositions, in their uncured state, capable of ready extrusion and more readily flowable, in conventional extrusion, molding, and other plastic forming operations, and which compositions will undergo the rigors of steam cure, as well as normal cure, steps to produce products having desirable properties.

(9) The elimination of the need for dewatering operations in the manufacture of asbestos-cement products.

(10) The provision of asbestos-cement product forming methods which allow the wider or increased use of certain grades of asbestos fibers which have not been acceptable in the forming procedures available heretofore.

(11) The provision of commercially usable extrusion procedures for forming asbestos-cement products.

(12) The provision of new asbestos-cement product forming operations which make possible the control of density of the final products through the use of controlled, varied amounts of water in the original compositions from which the final structures are formed.

The foregoing objects will be more fully understood and other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

This invention provides a unique solution to the various problems which have been encountered in the past in attempts at extruding, molding or other plastic forming of asbestos-cement wet mixes. Moreover, the solution to the problem does not require the use of special equipment and therefore does not substantially increase the cost of production of commercially usable products. Fundamentally, this is accomplished by adding to asbestos-cement compositions a small amount of a specific class of substances which may be termed "hydromodifiers." A more detailed discussion of hydromodifiers and specific examples of such materials is given hereinafter.

The unique advantages obtained through the incorporation of hydromodifiers in asbestos-cement compositions can be utilized generally in all procedures for the plastic forming of asbestos-cement mixes, e.g., compression-molding. However, this new technique in the forming of asbestos-cement mixes seems to have particular utility in the extrusion field and this specification is concerned largely with these new extrusion techniques.

By way of general description, an asbestos-cement wet mix utilizing the unique advantages of this invention would have a composition as follows in approximate percentage by weight:

|   | Percent |
|---|---|
| Hydraulic cement | 10–85 |
| Asbestos | 1–60 |
| Hydromodifier | 0.05–10 |
| Auxiliary cementing agent (e.g., silica) | Up to 55 |
| Water | 14–50 |
| Filler, pigments or like | Up to 25 |

A typical composition, lying within the range designated above and used to form a preferred commercial product, is a moist particulate mass of tractable consistency, the characteristics and properties of the mass being described hereinafter in greater detail. Such new compositions may be extruded or shaped by other plastic forming procedures into a desired shape, while substantially maintaining the homogeneous consistency of the combined ingredients to provide an uncured shape-retaining product which may then be subjected to curing conditions to harden the combined ingredients into a final product of high strength having substantially the same shape as produced by the froming operation.

The silica, which is exemplary of the auxiliary cementing agent, is optional in the new compositions and may be omitted in the case of so-called "normal cure" formulations, as distinguished from steam cure formulations, in which the added silica is characteristically included. Other ingredients such as fillers, wetting agents, flexing agents, plasticizing agents, dyes, pigment, lubricants, mold release agents, cement accelerators and the like may be included while utilizing the novel advantages attendant with the use of hydromodifiers in asbestos-cement compositions as disclosed herein.

Standard mixing and extrusion equipment which is readily available may be used with the new process and the mixing and extrusion conditions applicable to such equipment may be generally followed.

The success of the present invention is due to a large extent to the discovery that hydromodifiers can be added in small amounts to asbestos-cement wet mixes so that they may be subjected to pressure and shearing forces, such as would be encountered in normal extrusion operations, without having the composition undergo "dewatering." As a result, the asbestos-cement mixtures containing these hydromodifiers can be forced through an extrusion die at pressures readily attainable by conventional extruders to form shaped structures which are substantially self-sustaining. The structures so produced are substantially uniform and without objectionable cracks, pinholes, fissures or the like. These products may be cured, such as by the storage at ambient temperature under highly humid conditions, by water-curing or by steam-curing techniques, to obtain final products having density, strength and other characteristics at least as good as comparable asbestos-cement products which could be made prior to this invetion, e.g., products having a modulus of rupture from about 1000 to 6000 p.s.i. and a density of from about 60 to 125 pounds per cubic foot. Actually, many final products made in accordance with the inventive concepts contained herein possess strength and other characteristics superior to comparable shapes made by conventional procedures. This is in part due to the ability of the new forming processes to allow greater controlled variations in water content of the uncured, shaped asbestos-cement structures to be obtained. This, in turn, provides for more latitude in controlled variation in density and strength characteristics.

The hydromodifiers, when added to asbestos-cement compositions, produce in the resulting compositions a combination of properties which have made it possible for the first time successfully to extrude self-sustaining shapes from asbestos-cement compositions without the use of special and complicated equipment. The scientific reason for this unique result is not fully understood at this time, but the consistent and observable results which have been obtained time and again with numerous and varied compositions demonstrate the scope of applicability of the new discoveries. In partial clarification of these unique results, it should be pointed out that when water is added to dry, conventional asbestos-cement mixtures in just sufficient quantity to provide products which, upon curing will have high density and high strength, the resultant wetted mixture does not have the plasticity, flow characteristics or internal cohesion suitable for extrusion or molding. In the past using the "filtration process" forming operations, it has been necessary to add larger amounts of water to the dry-asbestos-cement mixtures, to produce more fluid compositions, but then the mixtures exhibit a pronounced tendency to dewater. Of course, this dewatering tendency has been of distinct advantage in these prior filtration procedures since, if the products produced thereby are to possess high enough densities to have high final strength, or are to possess suitable dimensional stability before curing, a considerable amount of water must be removed from the asbestos-cement slurry before it receives its final shape. On the other hand, as pointed out above, the dewatering tendencies of asbestos-cement mixtures have heretofore prevented successful extrusion of such mixtures from being accomplished. It has now been discovered that by using small amounts of hydromodifiers as herein defined in the asbestos-cement mixtures, the formation of extrudable mixtures can be attained which do not dewater under mechanical stress, and the water can be used in desired amounts such that it is not necessary to remove any to obtain substantially dimensionally stable, uncured products and cured products with high density and high strength. At the same time, as previously stated, the density of the new products can be controlled by regulating the amount of water included in the extrusion composition.

The drawing

In the accompanying drawing:

FIG. 1 is a flow diagram of the type suggested by M. O. Wolk, 30 J.P.O.S. 368, which indicates the major steps and preferred materials involved with this invention. Because of space limitations, this flow diagram cannot indicate all of the preferred details of the invention and the reader should refer to the specific examples and detailed description to obtain more complete information. Also, FIG. 1 is not intended to indicate that all steps must be performed in any particular sequence; for example, in the steps listed under wet hydromodifier the step of mixing the dry ingredients including cement, silica and asbestos may be done prior to or at the same time as the step of making the solution of hydromodifier, rather than thereafter as illustrated.

FIG. 2 is a graph which pictorially illustrates the improvement obtained by utilizing asbestos in the compositions provided by this invention. In FIG. 2, all representations of the amounts of asbestos, water and hydromodifier are based on 100 parts of binder, said binder comprising silica and cement in the ratio of 37.5:62.5. In FIG. 2, Curve No. 1, illustrated as a dotted line, encloses the area representing extrudable compositions containing no asbestos; the compositions comprising silica, cement, hydromodifier and water. Curve No. 2, illustrated as a dot-dash line, encloses the area representing extrudable compositions containing, in addition to the ingredients of the compositions of Curve No. 1, 10 parts by weight of asbestos. Curve No. 3, illustrated as a solid line, encloses the area representing extrudable compositions containing, in addition to the ingredients of the compositions of Curve No. 1, 25 parts by weight of asbestos. The abscissas of points on the curves indicate the amounts of water which may be used in extrudable compositions illustrated by FIG. 2, and the ordinates of points on the curves indicate the amounts of hydromodifier which may be used in the extrudable compositions illustrated by FIG. 2. It is to be understod that this graph represents only a few of the extrudable compositions disclosed in the instant invention and is not intended to depict the limits of all materials which are disclosed in the instant invention and is not intended to limit the invention in any manner. FIG. 2 illustrates that compositions containing no asbestos may be extruded but only in a range that is very limited and requires close controls relative to the water content and which therefore is not feasible for commercial operations. Also, in compositions containing no asbestos, it is necessary to use more hydromodifier and this is impracticable for economic comercial operations.

Hydromodifiers

The term "hydromodifier" is used herein to designate the specific class of substances which are useful in modifying asbestos-cement compositions to alter the dewatering tendencies of such compositions and provide the other unique results of this invention. A hydromodifier is a substance which will pass the "cement slurry test" as hereinafter defined. Hydromodifiers may be anionic or, preferably, cationic or nonionic and are stable in aqueous media having a pH between 10 and 12.5 and generally between 7 and 13, i.e., they do not exhibit decomposition, serious viscosity change, gellation, flocculation or the like at such high alkalinity. They may be solid or liquid substances and may be chemically pure compounds or commercial products containing the impurities generally associated with such products, or mixtures thereof.

The following is a list of some of the substances which are hydromodifiers for use in accordance with this invention:

Methyl cellulose
Hydroxy propoxyl methyl cellulose
Ethylene oxide polymer
Carboxy methyl hydroxy ethyl cellulose
Hydroxy ethyl cellulose ether
Partially hydrolyzed polyacrylamide, sodium salt
Casein
Acrylamide acrylic acid copolymer
Glue (hide)
Acrylamide polymer
Carboxy methyl starch ether
Polyvinyl alcohol Hydromodifiers may be used singly or in mixtures of two or more or in mixtures with supplementing materials which are not hydromodifiers. Table B, as explained hereinafter, lists mixtures which have been found to be usable and mixtures which have been found not to be usable with Portland cement.

Hydroxyl propoxyl methyl cellulose and ethylene oxide polymers are preferred hydromodifiers and of those commercially available, "Methocel 60HG (4000)" and "Methocel 65HG (4000)" and "Polyox WSR 301" have been found to give highest strength results. However, all grades of commercial methyl cellulose and hydroxyl propoxyl methyl cellulose appear to be usable. Other hydromodifiers which are particularly useful include hydroxy ethyl cellulose, e.g., "Natrosol 250"; partially hydrolyzed acrylamide polymer, e.g., "Separan NP10"; and acrylamide polymer, e.g., "Superfloc 16." Generally, with these preferred hydromodifiers used in the preferred ranges, the unit strength of extruded asbestos-cement structures increases as the percentage of the hydromodifier in the extruded composition is increased with a given water content. The results of the tests conducted in accordance with the disclosure of the instant invention indicate that to produce asbestos-cement products having the strength and other desired physical characteristics the hydromodifier should be an organic substance having a molecular weight in excess of about 400.

The cement slurry test

The organic modifying agents which may be used with asbestos-cement compositions to provide the new and improved results of this invention fall into a specific class of materials which may be easily distinguished from organic substances which are not usable by a specific reproducible test procedure which is referred to as the "cement slurry test." This test is conducted as follows:

(a) An aqeuous solution of the test substance to be tested is formed by dissolving 8 g. of it in 400 ml. of distilled water in a 600 ml. beaker 3" in diameter and 4.5" in height, to provide a homogeneous solution having a viscosity in the preferred range of 500 to 5000 cps. In instances wherein the test substances give a viscosity exceeding 5000 cps., the concentration may be decreased until the viscosity is in the preferred range. However, some test substances are not capable of giving solutions of at least 500 cps., and these test substances are tested at whatever viscosity may be obtained with a twenty percent (20%) solution concentration.

(b) A viscosity reading of the solution is taken. This reading and all subsequent readings are obtained using a Brookfield viscometer, model RVT at a running speed of 2.5 r.p.m. All viscosity readings are taken at 25° C. This reading is used to determine if an adjustment of the solution concentration is required to give the preferred viscosity as described in step (a).

(c) Stirring of the solution is now commenced and this is accomplished with the use of a "Fisher Versatile" heavy duty stirring apparatus equipped with a 2½ in.

diameter, 4-bladed propeller submerged approximately one-half way into the test solution. The stirrer is run at a speed to give efficient stirring; i.e., about 5000 r.p.m. with solutions of preferred viscosity. Solutions of lesser viscosity require slower stirring speeds to prevent them from being splashed out of the beaker.

(d) 200 g. of the cement which is to be used in forming an extrusion composition is added to the above solution in three increments, the first increment being added promptly after the solution has been prepared. This is done by adding 100 g. of the cement slowly (one to five minutes) in small portions to the solution as it is stirred, and stirring is continued for a total of fifteen minutes.

(e) The stirring is discontinued, and the slurry is observed as soon as it comes to rest. If it appears non-uniform or heterogeneous through coagulation, flocculation, separation or dewatering, the test substance is considered to have failed. Otherwise, the test is continued.

(f) Following observation, a viscosity reading is taken of the mixture. If the viscosity of the solution is below 50 cps., the test substance is considered to have failed.

(g) If the necessary viscosity and appearance are maintained, stirring is commenced again, and a second increment of 50 g. of cement is added to the mix, as in step (d), the slurry being stirred again for fifteen minutes.

(h) Step (e) is repeated.

(i) Following observation, a viscosity reading is taken of the mixture. If the viscosity of the solution drops below 50 cps. or if it has decreased more than 65 percent of the reading obtained in step (f), the test substance is considered to have failed.

(j) If the necessary viscosity and appearance are maintained, a third increment of 50 g. of cement is added as specified in step (g).

(k) Step (e) is repeated.

(l) Following observation, a viscosity reading is taken of the mixture. If the viscosity of the solution is below 50 cps. or if it has decreased more than 65 percent of the reading obtained in step (i), the test substance is considered to have failed.

(m) If the slurry passes step (e), it is allowed to stand for thirty minutes. If a smooth slurry remains, the additive is considered to be satisfactory. If it appears non-uniform or heterogeneous through coagulation, flocculation, separation or dewatering, the test substance is considered to have failed.

Precautions should be taken in conducting the test to insure proper solution preparation. The method of placing a test substance in solution will vary with the type of material. For example, some materials lose viscosity on heating or aging, while others shown the reverse effect. Some materials are difficult to dissolve under ordinary conditions and should be handled in special ways, such as pretreatment with organic solutions or other means described by their manufacturers.

Any substance which cannot produce a viscosity of at least 50 cps. at 25° C. in a concentration of not more than 20%, after the first 100 grams of cement has been added, as described above, fails the test at the start and is not a hydromodifier. A viscosity in the range of 500 cps. to 5000 cps. is preferred, since it has been found that most accurate test results are obtained using an initial solution within this optimum viscosity range. However, this viscosity is not mandatory; i.e., lower viscosities can be used with some materials.

The cement slurry test determines the workability and stability of the test substance in a cement slurry and differentiates hydromodifiers from non-workable materials. In the test, if the viscosity of the mixture changes to a great extent, or if the mixture flocculates, aggregates or dewaters after the addition of the first 100 g. increment of cement, it is not necessary to proceed further, as the material is already proved to be unsatisfactory. If no apparent change in appearance or viscosity takes place, the test is carried out as described until the total 200 g. of cement has been added.

The following Table A indicates the results which are obtained when different organic substances are subjected to a cement slurry test as described above, using Portland Type I cement. In this table, the column entitled TABLE A.—CEMENT SLURRY TEST RESULTS FOR VARIOUS TEST SUBSTANCES WITH PORTLAND CEMENT, TYPE T

| No. | Test substance | Cement Slurry Test Steps | | | | Extrusion test results |
|---|---|---|---|---|---|---|
| | | e 15 min. | h 30 min. | k 45 min. | m 75 min. | |
| 1 | "Methocel MC" series (4) | Yes | Yes | Yes | Yes | E. |
| 2 | "Methocel HG" series (6) | Yes | Yes | Yes | Yes | E. |
| 3 | "Polyox WSR-301" | Yes | Yes | Yes | Yes | E. |
| 4 | "CMHEC 43" | Yes | Yes | Yes | Yes | E. |
| 5 | CM Starch HH | Yes | Yes | Yes | Yes | E. |
| 6 | "Superclear" | Yes | Yes | Yes | Yes | E. |
| 7 | "Swift #10" | Yes | Yes | Yes | Yes | E. |
| 8 | "Separan NP 10" | Yes | Yes | Yes | Yes | E. |
| 9 | "Cyanamer P-26" | Yes | Yes | Yes | Yes | E. |
| 10 | "Superfloc 16" | Yes | Yes | Yes | Yes | E. |
| 11 | "Gelvatol" | Yes | Yes | Yes | Yes | E. |
| 12 | "Natrosol 250" | Yes | Yes | Yes | Yes | E. |
| 13 | "CMC 7H" | No (cement settles). | | | | X. |
| 14 | "CMC 12M" | do | | | | X. |
| 15 | "Jaguar Gum 507" | No (gels) | | | | X. |
| 16 | "Keltex" | No (gels and dewaters). | | | | X. |
| 17 | "Carbopol 934" | No gels) | | | | X. |
| 18 | Glyceryl monostearate | No (cement settles). | | | | X. |
| 19 | "Orzan S" | No (no viscosity). | | | | X. |
| 20 | "Polyco 296W" | No (decrease viscosity). | | | | X. |
| 21 | "Hydrogel" | No (gels) | | | | X. |
| 22 | "Superlose" | No (no viscosity). | | | | X. |
| 23 | "Ramalin G" | do | | | | X. |
| 24 | Gum Tragacanth | No (gels) | | | | X. |
| 25 | Gum Arabic | No (no viscosity). | | | | X. |
| 26 | "B211 Mogul Cereal Binder" (4% aqueous solution). | Yes | Yes | No (gels and dewaters). | | X. |
| 27 | "B211 Mogul Cereal Binder" (6% aqueous solution). | Yes | No (gels) | | | X. |

"E" means extrudable. "X" means non-extrudable.

"Test Substance" indicates the trademark or trade name for a commercially available product having the chemical composition indicated in subsequent Table E, and the column designated "Cement Slurry Test" indicates the results observed at steps e, h, k and m of the test for each of the first twelve test materials. For the subsequent materials, no observations are reported after the step at which each of these materials failed the test. The column designated "Extrusion Test Results" indicates the results obtained by actual extrusion tests using the procedures hereinafter described.

mercially available Portland cements are comparable to those reported in Table A, and all substances found acceptable for Type I cement have been likewise found acceptable for other types of commercially available Portland cements.

In carrying out extrusion or other mechanical forming of asbestos-cement compositions in accordance with this invention, it may not always be desirable to form a water-containing asbestos-cement mixture by prior solution of the hydromodifier in water. Thus, it may be desirable to form a dry premixture of all the dry ingredients, in-

TABLE E.—LIST OF COMMERCIAL CHEMICAL COMPOSITIONS AND THEIR MANUFACTURERS

| No. | Commercial name | Chemical Substance | Manufacturer |
| --- | --- | --- | --- |
| 1 | "Methocel MC" | Methyl cellulose | Dow Chem. Co. |
| 2 | "Methocel HG" | Hydroxy propoxyl methyl cellulose. | Do. |
| 3 | "Polyox" | Ethylene oxide polymer | Union Carbide Chem. Co. |
| 4 | "CMHEC" | Carboxy methyl hydroxy ethyl cellulose. | Hercules Powder Co. |
| 5 | "CM Starch HH" | Carboxy methyl starch ether | Nat'l. Starch Prod. Inc. |
| 6 | "Superclear" | Gelatin | Swift & Co. |
| 7 | "Swift #410" | do | Do. |
| 8 | "Separan NP 10" | Sodium salt of partially hydrolyzed polyacrylamide. | Dow Chemical Co. |
| 9 | "Cyanamer P-26" | Copolymer of acrylamide and acrylic acid. | American Cyanamid Co. |
| 10 | "Superfloc 16" | Polyacrylamide | Do. |
| 11 | "Gelvatol" | Polyvinyl alcohol | Shawinigan Resins Co. |
| 12 | "CMC 7H" | Carboxy methylcellulose | Hercules Powder Co. |
| 13 | "CMC 12M" | do | Do. |
| 14 | "Jaguar Gum 507" | Glactomannan | Stein Hall & Co. |
| 15 | "Keltax" | Sodium alginate | Kelco Co. |
| 16 | "Carbopol 934" | Carboxy vinyl polymer | B.F. Goodrich Chemical Co. |
| 17 | "Orzan S" | Sodium lignin sulfonate | Crown Zellerbach Co. |
| 18 | "Polyco 296W" | Sodium polyacrylate | Bordon Chemical Co. |
| 19 | "Hydrogel" | Silicated Polyalcohol | Troy Chemical Co. |
| 20 | "Superlose" | Amylose fraction of starch | Stein Hall & Co. |
| 21 | "Ramalin G" | Amylopectin fraction of starch | Do. |
| 22 | "B211 Mogul Cereal Binder" | Starch and protein cereal binder | Corn Product Co. |
| 23 | "Natrosol 250" | Hydroxy ethyl cellulose ether | Hercules Powder Co. |

The following Table B reports the results of the cement slurry test as described above with mixtures of Portland cement, Type I, and certain mixtures of Test Substances:

cluding the hydromodifier, and then to mix this with the desired amount of water to form the final extrusion composition. Some hydromodifiers which will pass the

TABLE B.—CEMENT SLURRY TEST ON MIXTURES OF TEST SUBSTANCES WITH PORTLAND CEMENT

| Test Substance Mixture | Results of Cement Slurry Test Steps | | | | Res. | Extrusion Test |
| --- | --- | --- | --- | --- | --- | --- |
| | e 15 m. | h 30 m. | k 45 m. | m 75 m. | | |
| 70% "Separan," 30% "Polyco" | Solution separates, decreases viscosity. | | | | N | X. |
| 70% "Polyco," 30% "Separan" | Dewaters, dec. viscosity greatly. | | | | N | X. |
| 70% "Polyox," 30% "Polyco" | Stable | Stable | Stable | Stable | A | E. |
| 30% "Polyox," 70% "Polyco" | Slow dewatering, large dec. viscosity. | | | | N | X. |
| 70% "MC 4000" (MC)+30% "CMC." | Stable | Stable | Stable | Stable | A | E. |
| 60% "MC 4000" (MC)+40% "CMC." | do | do | do | do | A | E. |
| 40% "MC 4000" (MC)+60% "CMC." | Dewaters | | | | N | X. |
| 30% "MC 4000" (MC)+70% "CMC." | do | | | | N | X. |
| 50% "MC 4000"+50% "MC 25" | Stable | Stable | Stable | Stable | A | E. |
| 70% "CMC"+30% "CM strach HH." | Great dec. in viscosity cement settles. | | | | N | E. |
| 30% "CMC"+70% "CM starch HH." | do | | | | N | X. |
| 50% "MC 4000"+50% "Separan" | Stable | Stable | Stable | Stable | A | E. |
| 70% "Polyox"+30% "Carbopol 934." | do | do | do | do | A | X. |
| 30% "Polyox"+70% "Carbopol 934." | Dewaters | | | | N | X. |
| 70% Gum Tragacanth+30% "Hydrogel." | Gels completely | | | | N | X. |
| 70% "Hydrogel"+30% Gum Tragacanth. | do | | | | N | X. |

"A" means acceptable (passed test). "N" means not acceptable (failed test). "E" means composition is extrudable. "X" means composition is not extrudable. "m." means minutes.

Using an extrusion procedure as described below, it will be found that the hydromodifiers, i.e., the first twelve substances in Table No. A, can be extruded to give satisfactory extruded asbestos-cement structures. In contrast, the remaining substances in Table A have been found to be unusable in the extrusion of compositions comprising Portland cement and asbestos.

In general, results obtained with other types of comcement slurry test as described above, may be unsatisfactory for dry premix use because of one of the following reasons:

(1) The hydromodifier may require special treatment to place it in solution, e.g., aging, heat, etc., and these could not be attained by simply adding water to a dry mix.

(2) The hydromodifier may be liquid or semi-fluid material which is unsuitable for dry powder mixing.

To determine whether or not a given hydromodifier can be used in the dry premix procedure, a supplemental cement slurry test should be conducted upon the hydromodifier.

This supplemental test procedure will be referred to herein as "Test 2" and the initial test will be referred to hereinafter as "Test 1" to distinguish between them. The procedure of Test 2 is as follows:

(A) Following the determination of the proper or workable amount of test hydromodifier to be used to obtain the proper solution viscosity by step (a) of Test 1, this amount of dry hydromodifier is added to 100 g. of cement, mixing well in the dry state.

(B) The cement-hydromodifier dry mixture is added to 400 ml. of water as described in steps (c) and (d) of Test 1.

(C) Steps (e) to (m) of Test 1, outlined above, are repeated, to determine the suitability of dry mixing of the hydromodifier.

The supplemental test procedure, Test 2, will, of course, not be used with non-solid additives, nor will Test 2 be used if the asbestos-cement composition is to be prepared using an aqueous solution of the hydromodifier.

As indicated hereinafter, various types of hydraulic cements may be used, e.g., Portland cement, slag cement, etc., and if the cement to be used in the final asbestos-cement composition is employed in the cement-slurry tests as described above, the tests will indicate whether the test substance is usable with the cement under consideration.

The following Table C reports the results of the cement slurry tests (both #1 and #2) on various test substances with supersulfated slag cement (Sealithor), and the following Table D reports results with a calcium aluminate cement sold under the trademark "Lumnite" by the Universal Atlas Cement Co. In these tables, the first column identifies the test substances by trademark (see Table E for chemical composition and manufacturer), the second column indicates if the test mixture passes step (f) of the test, column three indicates if the substance passes Test 1, column four does likewise for Test 2, column five indicates if the substance is usable as a modifying agent, and column six reports whether or not an asbestos-cement composition comprising the test substance extrudes satisfactorily using the extrusion test procedure reported hereinafter.

TABLE C.—CEMENT SLURRY TESTS ON VARIOUS TEST SUBSTANCES WITH A SUPERSULFATED SLAG CEMENT (SEALITHOR)

| Test Substances | Viscosity of 50 cps. | Test 1 | Test 2 | Results | Extrusion Test |
|---|---|---|---|---|---|
| 1 | 2 | 3 | 4 | 5 | 6 |
| "Methocel HG" | Yes | Yes | Yes | A | E. |
| "Methocel MG" | Yes | Yes | Yes | A | O. |
| "Polyox" | Yes | Yes | Yes | A | O. |
| "CMHEC" | Yes | Yes | Yes | A | O. |
| "Natrosol 250" | Yes | Yes | Yes | A | O. |
| "CM Starch HH" | Yes | Yes | Yes | A | O. |
| "Superclear" | Yes | No (gels) | | N | X. |
| "Swift 410" | Yes | No (gels) | | N | O. |
| "Separan NP 10" | Yes | Yes | Yes | A | O. |
| "Cyanamer" | Yes | Yes | Yes | A | E. |
| "Gelvatol" | Yes | Yes | No | AS | ES. |
| "CMC" | Yes | Yes | Yes | A | E. |
| "Keltex" | No | No | | N | X. |
| Glycerol Monostearate | No | No | | N | O. |
| | | Cement settles | | | |
| "Polyco" | Yes | No (large loss of viscosity) | | N | O. |
| "Hydrogel" | Yes | Yes | Yes | A | O. |
| "Ramalin G" | No | | | N | O. |
| Gum Tragacanth | Yes | Yes | Yes | A | E. |
| "Carbopol 934" | No | | | N | O. |
| "Orzan S" | No | | | N | O. |
| "Jaguar 507" | Yes | Yes | Yes | A | E. |
| Gum Arabic | No | | | N | O. |

"A" means acceptable. "N" means non-acceptable. "AS" means acceptable, solution only. "E" means extrudable. "X" means non-extrudable. "ES" means extrudable, solution only. "O" means the composition was not subjected to this test.

TABLE D.—CEMENT SLURRY TESTS ON VARIOUS TEST SUBSTANCES WITH A CALCIUM ALUMINATE CEMENT (LUMNITE)

| Test Substances | Viscosity of 50 cps. | Test 1 | Test 2 | Results | Extrusion Test |
|---|---|---|---|---|---|
| 1 | 2 | 3 | 4 | 5 | 6 |
| "Methocel HG" | Yes | Yes | Yes | A | E. |
| "Methocel MC" | Yes | Yes | Yes | A | O. |
| "Polyox" | Yes | Yes | Yes | A | O. |
| "CMHEC" | Yes | Yes | Yes | A | O. |
| "Natrosol 250" | Yes | Yes | Yes | A | O. |
| "CM Starch HH" | Yes | Yes | Yes | A | O. |
| "Supreclear" | Yes | No (gels) | Yes | N | X. |
| "Swift 410" | Yes | ...do... | | N | O. |
| "Separan NP 10" | Yes | Yes | Yes | A | O. |
| "Superfloc" | Yes | Yes | Yes | A | O. |
| "Gelvatol" | Yes | Yes | No | AS | ES. |
| "CMC" | Yes | No (gels) | No | N | X. |
| "Keltex" | Yes (gels) | No | | N | O. |
| Glycerol monostearate | No | No | | N | O. |
| "Polyco" | Yes | No (large dec. in viscosity) | | N | O. |
| "Hydrogel" | Yes | Yes | Yes | A | O. |
| "Ramalin G" | No | No | | N | X. |
| Gum Tragacanth | Yes | No | | N | O. |
| "Carbopol 934" | No | No | | N | O. |
| "Orzan S" | No | No | | N | O. |
| "Jaguar 507" | Yes | Yes | Yes | A | O. |
| Gum Arabic | No | | | N | O. |
| "Cyanamer" | Yes | Yes | Yes | A | E. |

"A" means acceptable. "N" means non-acceptable. "AS" means acceptable, solution only. "E" means extrudable. "X" means non-extrudable. "ES" means extrudable, solution only. "O" means the composition was not subjected to this test.

Extrusion test procedure

An extrusion test procedure has been developed for the preparation of ¼ in. x 3 in. x 8 in. extruded slabs which may be used as test coupons for measuring the physical properties attainable in cured asbestos-cement structures. This procedure may be used as a standard sample preparation and testing procedure in evaluating raw materials, hydromodifiers and process variables in the investigation of asbestos-cement extrusion operations.

The operations of this example are based upon the use of a standard asbestos-cement composition batch, as follows:

| Dry Furnish Standard Batch | By Weight | |
|---|---|---|
| | Percent | Parts |
| Hydraulic cement | 50 | 1,500 |
| Asbestos | 20 | 600 |
| Silica | 30 | 900 |
| Total | 100 | 3,000 |

According to the established procedure, water and hydromodifier are added in an amount of 750 parts for each 3000 parts of the dry furnish, so that the total weight of hydromodifier and water is 25% of the dry furnish weight. This is called a mixture having 25% solution added. The amount of hydromodifier used is such that the hydromodifier and water combined would form a 3% aqueous solution, that is:

| Added Solution | By Weight | |
|---|---|---|
| | Percent | Parts |
| Hydromodifier | 3 | 22.5 |
| Water | 97 | 727.5 |
| Total | 100 | 750 |

The major items of equipment used in carrying out the extrusion are an extruder, a hydraulic pump, a sigma blade wet mixer, a dry mixer and a tamper-preformer. The extruder is a hydraulic powered, ram-type extruder having approximately a 3½ in. bore and a 13½ in. stroke. The extruder is powered by a hydraulic pump having a capacity of 5 gallons per minute at 2000 p.s.i. The pump is provided with a flow control and a maximum pressure control and draws from a 20 gallon reservoir.

The wet mixer is a "Baker-Perkins" sigma blade mixer with a 2½ gal. working capacity. Both blades rotate at a constant speed of 70 r.p.m., and the mixer is provided with a shut-off and automatic reset timer to control the mixing time. The dry mixer is a "Readco Type P-15" mixer equipped with a blade type beater.

The preformer is a 14 in. long steel tube (3¼ in. I.D., 3½ in. O.D.) split in half longitudinally, hinged and mounted vertically on a 12 x 12 x ¼ in. steel base. A flared section is welded at the top of the tube to facilitate loading of the wet mix. A steel tamping bar is also provided.

The extrusion die opening is 3 in. wide by 0.4 in. high, the corners of the opening being filleted with a 1/16 in. radius. The minimum land length is 6 in. and the rear of the die is coned at an angle of 60° to provide smooth transistion from the round extruder bore to the rectangular die opening. The entire interior of the die is hard chromium plated.

In order to provide a standard basis for comparison between results obtained in conducting the procedures of this example at different time intervals, a standard asbestos-cement test composition is run with each separate group of extrusion tests. The composition used as a standard employs hydroxy propoxyl methyl cellulose as the hydromodifier. The product designated "Methocel 60HG (4000)" which is a hydroxy propoxyl methyl cellulose of 4000 cps. viscosity (2% aqueous solution at 20°) sold by Dow Chemical Co. is the specific commercially-available hydromodifier employed. The standard composition also employs as the asbestos a Canadian chrysotile having the grade designation "6D20" sold by Johns-Manville, which has been processed once through a standard willow. The cement employed is a Type I Portland cement having the trade designation "Pioneer National" and the silica is a silica flour with the trade designation "New Jersey Silex."

To begin each separate extrusion operation, the fiber, cement, silica and hydromodifier are accurately weighed and placed in the bowl of the dry mixer. The water to be used is distilled water adjusted to a temperature of approximately 70° F. (the extrusion operations are carried out at approximately normal room temperature), and the required amount of water is weighed into a suitable container. If a solution of hydromodifier, instead of a dry premix, is used, it is treated exactly as the water, and no hydromodifier is incorporated with the dry materials.

The dry mixer is started and is allowed to run for five minutes, when it is automatically stopped by the timer. The dry mixed materials are then dumped into the wet mixer, the wet mixer is turned on, and the weighed amount of water (or solution, as the case may be) is poured into the mixer. These materials are then wet mixed for a total of fifteen minutes in two 7 and ½ minute increments. After the first increment, the blades and side walls of the mixer are scraped to remove any accumulation of material, and the mixer is restarted and run for a second interval of 7 and ½ minutes. This incremental mixing and the cleaning of the mixer blades is not essential to the extrusion operation, but aids in obtaining a more uniform mix and in keeping the equipment clean.

At the end of the fifteen minute wet mixing cycle, the asbestos-cement composition is dumped from the mixer into a suitable container. The standard composition has a granular, greenish brown, wet appearance, is moist to the touch, and can be crumbled between the fingers. Test compositions made with other hydromodifiers, but the same amount of water, have been found to have generally the same appearance, although varying slightly in friability, texture and color. Test compositions made with less water content than the standard batch are generally more crumbly, while compositions made with more water tend to be more pasty as the amount of water is increased.

The wet mixed material is dumped from the container into the preformer in three or four increments and is tamped after the addition of each increment. This preforming step is not essential to the extrusion operation, but provides an easy, efficient way of introducing the mixture into the bore of the extruder. Close examination of the tamped cylinder of the wet composition removed by opening the preformer, shows that the preformed mix is not completely homogeneous. The preformed cylinder has just sufficient cohesion to make it handleable so that it can be inserted into the extruder bore.

The preformed cylinder of wet mix is placed in the bore of the extruder, and the die and die retaining ring are attached. The die is leveled, and a takeoff table is rolled into place adjacent to the outlet opening of the extrusion die. The hydraulic power is applied to the ram, and the extruded material issues from the die onto a strip of paper or thin plastic film supported on the takeoff table. This paper or film is pulled away from the die by the extrusion operator at a speed coinciding with the speed with which the column of material extrudes from the die. The rate of extrusion is measured in feet per minute.

The rate of movement of the extruder ram is controlled through the use of a flow control valve in the hydraulic system. This valve is set so that the empty ram travel time is forty seconds. The empty ram travel time is defined as the time, in seconds, required for the ram to complete a full forward stroke when the bore of the extruder is empty and the die is not attached. This is set and checked periodically.

If the land of the die contains material from a preceding operation, the extruder is run until twelve to eighteen inches of material has been extruded. This portion is discarded and the new column of extruded material is handled as described above.

The die and die retaining ring are removed from the extruder after each successive batch of test composition, and the material remaining in the cone in the rear of the die is dug out and discarded.

The first twelve inches of the extruded column of each separate test composition is discarded and the remainder of the extruded column is cut into 8 in. long samples. This is accomplished by using a cutting bar which has two knives spaced 8 in. apart, the knives being slightly wider than the extruded asbestos-cement column. The samples are transferred to wax-coated asbestos-cement board spacers approximately 8½ x 3½ x ¼ inches. Each such sample is transferred to a weighing scale and the weight of the extruded sample is obtained.

With each separate extrusion operation, the extrusion pressure is determined by a pressure gauge installed in the hydraulic system of the extruder ram.

Immediately after the weights of the extruded samples are obtained, the samples are stacked on their asbestos-cement board spacers, a spacer being placed on the top of the stack, and the stack is stored in a humidity cabinet maintained at 70° F. and 100% relative humidity for twenty-four hours. After the twenty-four hour air cure has been completed, samples are removed from the cabinet, separated from the board spacers and placed on edge in metal racks in an autoclave. The samples are then steam cured for sixteen hours at 100 p.s.i.g. saturated steam.

If the samples are to be normal cured, they are left in the humidity cabinet for an additional five or twenty-six days, depending on the cure desired and then are immersed in water one day prior to testing. A normal cure dry furnish contains no added silica and consists, for example, of 2400 parts of cement and 600 parts of asbestos fiber, denoted as 20% fiber level.

After the curing of the samples is completed, and prior to testing, they are immersed in water for twenty-four hours. The saturated weight (weight in air) and immersed weight (weight in water) are obtained. The samples are tested in the saturated state on a six inch span, center point loading, using a "Baldwin-Lima-Hamilton" testing machine with a 120-lb. load cell. Subsequent to breaking the sample, the width is measured to the nearest thousandth of an inch using a dial caliper. Three measurements of the thickness are then obtained using a micrometer or dial gauge and the average thickness to the nearest thousandth of an inch is recorded.

The broken samples are placed in an oven (220° F.) for twenty-four hours, after which the dry weight is obtained.

Using the data mentioned above (extruded weight, saturated weight, immersed weight, breaking load, width, average thickness, and dry weight) density moisture content and strength properties of the extruded and cured products are calculated.

Using the standard test composition with hydroxy propoxyl methyl cellulose as the hydromodifier, 330 separate extrusions were performed. The average density of the extruded asbestos-cement samples was found to be 109.7 p.c.f. (maximum of 115 p.c.f. and minimum of 105 p.c.f.), and the average modulus of rupture was found to be 3890 p.s.i. (maximum of 4440 p.s.i. and minimum of 3130 p.s.i.).

Different extrusion compositions prepared with different materials produce varied results when attempts are made to extrude them. A hydromodifier when added in a concentration as described herein to the asbestos-cement mixture, will enable the test composition to leave the extrusion die as a smooth, homogeneous column having and maintaining approximately equal to the dimensions of the die opening. At the same time, there is with hydromodifiers, no splitting, cracking, curling, crumbling or reaction in any other manner which prevents a smooth, homogeneous column from being obtained. Any material which does not comply with these conditions in any possible concentration up to 10% by weight of the wet mix has been found to fail the cement slurry test (Test 1) and is not classifiable as a hydromodifier.

Using the extrusion test procedure, as set forth above in the standard extrusion example, a variety of substances were tested as possible hydromodifiers for use in asbestos-cement extrusion. The results of these operations are reported in the following Table F. In this table, the modulus of rupture (MR) is expressed as a percentage of the modulus of rupture of the standard control made during the same time interval. Also, the density values are expressed as percentages of the standard average value of 109.7 p.c.f. The designations (P) or (S) indicate whether the test substance was added as a powder or as an aqueous solution. The designation (F) indicates that the composition in question failed to extrude completely or else in such fashion that the column split, cracked or the like, so that test samples could not be obtained.

TABLE F

| Test Substance | S or P | MR, Percent | Density, Percent |
|---|---|---|---|
| "Methocel 60HG" 4,000 c.p.s. grade | P | 100.0 | 100.0 |
| "Methocel 60HG" 50 c.p.s. grade | P | 81.9 | 99.1 |
| "Methocel 65HG" 400 c.p.s. grade | P | 94.2 | 97.4 |
| "Methocel 65HG" 4,000 c.p.s. grade | P | 101.0 | 99.4 |
| "Methocel 70HG" 4,000 c.p.s. grade | P | 96.7 | 98.7 |
| "Methocel MC" 25 c.p.s. grade | P | 79.3 | 98.6 |
| "Methocel MC" 400 c.p.s. grade | P | 90.5 | 99.0 |
| "Methocel MC" 4,000 c.p.s. grade | P | 86.7 | 100.5 |
| "Methocel MC" 8,000 c.p.s. grade | P | 89.7 | 98.6 |
| "Polyox WSR 301" | P | 77.9 | 100.2 |
| "Polyox WSR 301" | S | 100.5 | 104.5 |
| "Separan NP 10" | P | 83.7 | 98.9 |
| "Separan NP 10" | S | 98.4 | 98.2 |
| "Cyanamer P26" | P | 69.2 | 98.9 |
| "Cyanamer P26" | S | 80.0 | 100.1 |
| "Natrosol 250" | P | 87.7 | 99.0 |
| "Superfloc #16" | P | 99.4 | 103.0 |
| "Gelvatol 1-90" | P | F | |
| "Gelvatol 1-90" | S | 75.6 | 91.6 |
| "Juguar 507" | P | F | |
| "Jaguar 507" | S | F | |
| "Superlose" | P | F | |
| "Superlose" | S | F | |
| "Keltex" | P | F | |
| "Keltex" | S | F | |
| "B211 Mogul Cereal Binder" | S | F | |
| "Ramalin" | S | F | |
| "Orzan S" | S | F | |
| "Polyco 296W" | S | F | |
| Bentonite 10% | S | F | |
| Glycerol Monostearate | S | F | |
| "Hydrogel" | S | F | |
| Gum arabic | S | F | |
| Kaolin | S | F | |

S—means solution. P—means powder. F—means failed to extrude.

Of course, the test procedure as described above may be used with asbestos-cement wet mixes having proportions of ingredients different from the standard mix as stated above. This would be used, for example, in testing the effectiveness of hydromodifiers at various concentrations, effect of filler content, or the like.

EXAMPLES

The following examples illustrate actual compositions extruded successfully in operations in accordance with the disclosure of the instant invention. In these examples and throughout the specification, all parts and percentages of ingredients are calculated by weight unless otherwise specified. The proportions of ingredients in these examples are stated in three different systems, which will be explained hereinafter. Unless otherwise indicated the binder, as set forth in these examples, comprises cement-silica ratio of 62.5:37.5.

Example 1:

| | Percent |
|---|---|
| Asbestos | 33.4 |
| Cement | 9.0 |
| Silica | 5.4 |
| Water | 50.1 |
| Hydromodifier | 2.1 |
| Total | 100.0 |

| | Parts |
|---|---|
| Binder | 100 |
| Asbestos | 233 |
| Water | 350 |
| Hydromodifier | 15 |
| | 698 |

Dry furnish:

| | Percent |
|---|---|
| Asbestos | 70.0 |
| Cement | 18.8 |
| Silica | 11.2 |
| Total | 100.0 |

| | |
|---|---|
| Solution added | 109.6 |
| Solution concentration | 4.11 |

Example 2:

| | Percent |
|---|---|
| Asbestos | 53.66 |
| Cement | 14.37 |
| Silica | 8.62 |
| Water | 22.89 |
| Hydromodifier | .46 |
| Total | 100.00 |

| | Parts |
|---|---|
| Binder | 100 |
| Asbestos | 233 |
| Water | 100 |
| Hydromodifier | 2 |
| | 435 |

Example 3:

| | Percent |
|---|---|
| Asbestos | 8.0 |
| Cement | 72.0 |
| Water | 19.4 |
| Hydromodifier | 0.6 |
| Total | 100.0 |

Dry furnish:

| | |
|---|---|
| Asbestos | 10 |
| Cement | 90 |
| Total | 100 |

| | |
|---|---|
| Solution added | 25 |
| Solution concentration | 3.0 |

Example 4:

| | Percent |
|---|---|
| Asbestos | 16.0 |
| Cement | 29.1 |
| Silica | 34.9 |
| Water | 19.4 |
| Hydromodifier | 0.6 |
| Total | 100.0 |

| | Parts |
|---|---|
| Binder (cement:silica=45.5:54.5) | 100.00 |
| Asbestos | 25.00 |
| Water | 30.31 |
| Hydromodifier | 0.94 |
| | 156.25 |

Dry furnish:

| | Percent |
|---|---|
| Asbestos | 20.0 |
| Cement | 36.4 |
| Silica | 43.6 |
| Total | 100.0 |

| | |
|---|---|
| Solution added | 25.0 |
| Solution concentration | 3.0 |

Example 5:

| | Percent |
|---|---|
| Asbestos | 4.8 |
| Cement | 29.8 |
| Silica | 17.8 |
| Water | 40.5 |
| Hydromodifier | 7.1 |
| | 100.0 |

| | Parts |
|---|---|
| Binder | 100 |
| Asbestos | 10 |
| Water | 85 |
| Hydromodifier | 15 |
| | 210 |

Dry furnish:

| | Percent |
|---|---|
| Asbestos | 9.09 |
| Cement | 56.82 |
| Silica | 34.09 |
| Total | 100.00 |

| | |
|---|---|
| Solution added | 90.9 |
| Solution concentration | 15.0 |

Example 6:

| | Percent |
|---|---|
| Asbestos | 13.4 |
| Cement | 33.6 |
| Silica | 20.2 |
| Water | 26.9 |
| Hydromodifier | 5.9 |
| | 100.0 |

| | Parts |
|---|---|
| Binder | 100 |
| Asbestos | 25 |
| Water | 50 |
| Hydromodifier | 11 |
| | 186 |

Dry furnish:

| | Percent |
|---|---|
| Asbestos | 20 |
| Cement | 50 |
| Silica | 30 |
| Total | 100 |

| | |
|---|---|
| Solution added | 48.8 |
| Solution concentration | 18.0 |

Example 7:

| | Percent |
|---|---|
| Asbestos | 14.8 |
| Cement | 37.0 |
| Silica | 4.4 |
| Calcined clay | 17.8 |
| Water | 25.2 |
| Hydromodifier | 0.8 |
| | 100.0 |

| | Parts |
|---|---|
| Binder (cement:silica=89.3:10.7) | 100.0 |
| Asbestos | 35.7 |
| Calcined clay | 42.9 |
| Water | 60.6 |
| Hydromodifier | 1.9 |
| | 241.1 |

Dry furnish:                    Percent
    Asbestos _____ 20
    Cement _____ 50
    Silica _____ 6
    Calcined clay _____ 24

Total _____ 100

Solution added _____ 35
Solution concentration _____ 3

Example 8:                      Percent
    Asbestos _____ 14.8
    Cement _____ 37.0
    Silica _____ 17.8
    Perlite _____ 4.4
    Water _____ 25.2
    Hydromodifier _____ 0.8

100.0

Parts
Binder (cement:silica=67.6:32.4) ___ 100.0
Asbestos _____ 27.0
Perlite _____ 8.1
Water _____ 45.9
Hydromodifier _____ 1.4

182.4

Dry furnish:                    Percent
    Asbestos _____ 20
    Cement _____ 50
    Silica _____ 24
    Perlite _____ 6

Total _____ 100

Solution added _____ 35
Solution concentration _____ 3

Example 9:                      Percent
    Asbestos _____ 16.0
    Cement _____ 40.0
    Silica _____ 24.0
    Water _____ 19.4
    Hydromodifier _____ 0.6

100.0

Parts
Binder _____ 100.00
Asbestos _____ 25.00
Water _____ 30.31
Hydromodifier _____ 0.94

156.25

Dry furnish:                    Percent
    Asbestos _____ 20
    Cement _____ 50
    Silica _____ 30

Total _____ 100

Solution added _____ 25
Solution concentration _____ 3

Example 10:                     Percent
    Asbestos _____ 36.0
    Cement _____ 9.6
    Silica _____ 5.8
    Water _____ 46.3
    Hydromodifier _____ 2.3

100.0

Parts
Binder _____ 100
Asbestos _____ 233
Water _____ 300
Hydromodifier _____ 15

648

Dry furnish:                    Percent
    Asbestos _____ 70.0
    Cement _____ 18.8
    Silica _____ 11.2

100.0

Solution added _____ 94.6
Solution concentration _____ 4.8

In the foregoing Examples 1 to 10, the cement was type I Portland cement, the silica was in the form of flour, the asbestos was Canadian chrysotile asbestos and the hydromodifier was hydroxy propoxyl methyl cellulose 4000 viscosity grade ("Methocel 60HG 4000").

Example 11:                     Percent
    Asbestos _____ 15.14
    Cement _____ 37.84
    Silica _____ 22.71
    Water _____ 24.22
    Hydromodifier _____ 0.09

100.00

Parts
Binder _____ 100
Asbestos _____ 25
Water _____ 40
Hydromodifier _____ 0.15

165.15

Dry furnish:                    Percent
    Asbestos _____ 20
    Cement _____ 50
    Silica _____ 30

Total _____ 100

Solution added _____ 32.1
Solution concentration _____ 0.37

The hydromodifier was an ethylene oxide polymer ("Polyox WSR701").

Example 12:                     Percent
    Asbestos _____ 15.34
    Cement _____ 38.33
    Silica _____ 23.01
    Water _____ 23.01
    Hydromodifier _____ 0.31

100.00

Parts
Binder _____ 100.0
Asbestos _____ 25.0
Water _____ 37.5
Hydromodifier _____ 0.5

163.0

Dry furnish:                    Percent
    Asbestos _____ 20
    Cement _____ 50
    Silica _____ 30

Total _____ 100

Solution added _____ 30.4
Solution concentration _____ 1.3

The hydromodifier was an ethylene oxide polymer ("Polyox WSR 301").

Example 13:

| | Percent |
|---|---|
| Asbestos | 16.0 |
| Cement | 40.0 |
| Silica | 24.0 |
| Water | 19.4 |
| Hydromodifier | 0.6 |
| | 100.0 |

| | Parts |
|---|---|
| Binder | 100.00 |
| Asbestos | 25.00 |
| Water | 30.31 |
| Hydromodifier | .94 |
| | 156.25 |

Dry furnish:

| | Percent |
|---|---|
| Asbestos | 20 |
| Cement | 50 |
| Silica | 30 |
| Total | 100 |
| Solution added | 25 |
| Solution concentration | 3 |

The hydromodifier was the sodium salt of partially hydrolized polyacrylamide ("Separan NP10").

Example 14:

| | Percent |
|---|---|
| Asbestos | 16.0 |
| Cement | 40.0 |
| Silica | 24.0 |
| Water | 19.6 |
| Hydromodifier | 0.4 |
| | 100.0 |

| | Parts |
|---|---|
| Binder | 100.00 |
| Asbestos | 25.00 |
| Water | 30.62 |
| Hydromodifier | 0.63 |
| | 156.25 |

Dry furnish:

| | Percent |
|---|---|
| Asbestos | 20 |
| Cement | 50 |
| Silica | 30 |
| Total | 100 |
| Solution added | 25.0 |
| Solution concentration | 2.0 |

The hydromodifier was a hydroxy ethyl cellulose ether ("Natrosol 250").

Example 15:

| | Percent |
|---|---|
| Asbestos | 16.0 |
| Cement | 40.0 |
| Silica | 24.0 |
| Water | 19.4 |
| Hydromodifier | 0.6 |
| | 100.0 |

| | Parts |
|---|---|
| Binder | 100.00 |
| Asbestos | 25.00 |
| Water | 30.31 |
| Hydromodifier | 0.94 |
| | 156.25 |

Dry furnish:

| | Percent |
|---|---|
| Asbestos | 20 |
| Cement | 50 |
| Silica | 30 |
| Total | 100 |
| Solution added | 25.0 |
| Solution concentration | 3.0 |

The hydromodifier was a copolymer of acrylamide and acrylic acid ("Cyanamer P-26"). The cement, silica and asbestos in Examples 11 through 15 were as in Examples 1 to 10.

Example 16:

| | Percent |
|---|---|
| Asbestos | 6.00 |
| Cement | 46.25 |
| Silica | 27.76 |
| Water | 18.95 |
| Hydromodifier | 1.04 |
| | 100.00 |

| | Parts |
|---|---|
| Binder | 100.0 |
| Asbestos | 8.1 |
| Water | 25.6 |
| Hydromodifier | 1.4 |
| | 135.1 |

Dry furnish:

| | Percent |
|---|---|
| Asbestos | 7.5 |
| Cement | 57.8 |
| Silica | 34.7 |
| Total | 100.0 |
| Solution added | 25.0 |
| Solution concentration | 5.0 |

The asbestos was Australian crocidolite asbestos which has been processed one time through a commercially available "Entoleter" centrifugal impact mill.

Example 17:

| | Percent |
|---|---|
| Asbestos | 17.23 |
| Cement | 32.33 |
| Silica | 19.40 |
| Water | 30.11 |
| Hydromodifier | 0.93 |
| | 100.0 |

| | Parts |
|---|---|
| Binder | 100.0 |
| Asbestos | 33.3 |
| Water | 58.2 |
| Hydromodifier | 1.8 |
| | 193.3 |

Dry furnish:

| | Percent |
|---|---|
| Asbestos | 25.0 |
| Cement | 46.9 |
| Silica | 28.1 |
| Total | 100.0 |
| Solution added | 45.0 |
| Solution concentration | 3.0 |

The asbestos was amosite asbestos.

Example 18:

| | Percent |
|---|---|
| Asbestos | 8.0 |
| Cement | 45.0 |
| Silica | 27.0 |
| Water | 19.4 |
| Hydromodifier | 0.6 |
| | 100.0 |

|  | Parts |
|---|---|
| Binder | 100.0 |
| Asbestos | 11.11 |
| Water | 26.95 |
| Hydromodifier | .83 |
|  | 138.89 |

| Dry furnish: | Percent |
|---|---|
| Asbestos | 10.0 |
| Cement | 56.3 |
| Silica | 33.7 |
| Total | 100.0 |
| Solution added | 25 |
| Solution concentration | 3 |

The asbestos was a blend of 30% Australian crocidolite and 70% Canadian chrysotile to which had been added 20% ground reprocessed material.

The hydromodifier, silica and cement of Examples 16–18 were as in Examples 1 to 10.

| Example 19: | Percent |
|---|---|
| Asbestos | 14.3 |
| Cement | 57.1 |
| Water | 27.4 |
| Hydromodifier | 1.2 |
|  | 100.0 |

|  | Parts |
|---|---|
| Cement | 100.0 |
| Asbestos | 25.0 |
| Water | 48.0 |
| Hydromodifier | 2.0 |
|  | 175.0 |

| Dry furnish: | Percent |
|---|---|
| Asbestos | 20 |
| Cement | 80 |
| Total | 100 |
| Solution added | 40.0 |
| Solution concentration | 4.0 |

The cement in this example was calcium aluminate cement, the hydromodifier was polyvinyl alcohol ("Gelvatol 1–90") and the asbestos was Canadian chrysotile.

| Example 20: | Percent |
|---|---|
| Asbestos | 14.81 |
| Cement | 37.05 |
| Silica | 22.22 |
| Water | 25.53 |
| Hydromodifier | 0.39 |
|  | 100.00 |

|  | Parts |
|---|---|
| Binder | 100.00 |
| Asbestos | 25.00 |
| Water | 43.09 |
| Hydromodifier | .66 |
|  | 168.75 |

| Dry furnish: | Percent |
|---|---|
| Asbestos | 20 |
| Cement | 50 |
| Silica | 30 |
| Total | 100 |
| Solution added | 35.0 |
| Solution concentration | 1.5 |

The cement in this example was supersulphated slag cement, the asbestos was Canadian chrysotile, the hydromodifier was glactomannan ("Jaguar Gum 507"), and the silica was in the form of flour.

| Example 21: | Percent |
|---|---|
| Asbestos | 1.55 |
| Cement | 48.26 |
| Silica | 28.96 |
| Water | 19.69 |
| Hydromodifier | 1.54 |
| Total | 100.00 |

|  | Parts |
|---|---|
| Binder | 100 |
| Asbestos | 2 |
| Water | 25.5 |
| Hydromodifier | 2 |
|  | 129.5 |

| Dry furnish: | Percent |
|---|---|
| Asbestos | 1.97 |
| Cement | 61.27 |
| Silica | 36.76 |
|  | 100.00 |
| Solution added | 26.96 |
| Solution concentration | 7.27 |

In the foregoing Example 21, the cement was Type I Portland cement, the silica was in the form of flour, the asbestos was Canadian chrysotile asbestos and the hydromodifier was hydroxy propoxyl methyl cellulose 4000 viscosity grade ("Methocel 60HG 400").

*Discussion of various details*

A predominant ingredient of the preferred new asbestos-cement composition of this invention is the cement binder. This may consist of a suitable hydraulic cement by itself or in combination with an auxiliary cementing agent.

A wide variety of hydraulic cement materials usable in the invention are known and are commercially available. Preferably, the cement should be of the alkaline type, i.e., a hydraulic cement which, when mixed with water, produces a slurry having a pH above 7. Portland cement is particularly useful and all types of this cement appear to function satisfactorily. Other hydraulic cements which may be used include supersulphated slag cement, calcium aluminate cement, natural cement, pozzolana cement, lime, and similar materials.

The various types of hydraulic cements as mentioned above differ in chemical composition and in setting properties and other aspects. For example, the supersulphated slag and calcium aluminate cements produce water slurries of lower alkalinity than Portland cement, i.e., a pH of about 11.5 as compared to about 12.7 for Portland cement. These differences may produce some variation in the effectiveness of hydromodifiers when used in asbestos-cement compositions in accordance with the invention. If the hydromodifier is sensitive to the ionic strength of certain electrolytes which may be present in one cement and not in another, the effectiveness of the agent may be substantially impaired with that particular cement. Hydroxy propoxyl methyl cellulose, for example, is a hydromodifier which has been found to be equally effective for all alkaline hydraulic cements, whereas carboxy methyl cellulose is recommended for use with the lower alkaline cements, such as supersulphated slag cement. This variation in hydromodifier activity, however, presents no problem since, as previously indicated, the cement used in the cement slurry test is the particular cement to be used in forming the extruding compositions, and the cement slurry test, therefore, provides for the accurate determination of the effectiveness of a particular substance for use with any desired cement.

An auxiliary cementing agent can be used as a component of the cement binder if the final product is to be steam cured. Silica flour is particularly useful for this purpose, but other siliceous materials may be employed such as fly ash, calcined clay, fine sand, blast-furnace slag and similar materials known to the art to be useful with alkaline hydraulic cements to form steam cured cement structures. When silica or other auxiliary cementing agent is used, the ratio of cement to siliceous material should be between about 1:5 and 10:1 and preferably, between 1:3 and 3:1.

The silica or other siliceous material under the conditions which prevail in steam curing, reacts with the hydraulic cement to form the final binding matrix. Since steam curing is employed advantageously in commercial production of asbestos-cement products, it is a significant advantage of the instant invention that in general the mixes incorporating the hydromodifiers and their performance in accordance with the invention are not detrimentally affected to any great extent by the rigors of steam cure operations. It is possible to include additional particulate materials in the cement compositions which are relatively inert, i.e., do not react to any appreciable extent with the cement in forming the final binding matrix. Such materials are referred to as fillers. Examples of such materials are stone flour, ground shale, kaolin, perlite and similar aggregates. Up to 25% or more by weight of fillers and particularly up to 10% by weight, may be employed in the asbestos-cement compositions. Some materials which act primarily as fillers do, however, contain silica or equivalent materials and will function to a limited extent as auxiliary cementing agents.

Fillers are usually employed to give final products of lower density. Fillers may also be used to modify the workability, brittleness and other physical properties of the products. Since a lower density usually results in decreased strength, fillers are not recommended where final structures of highest strength are desired. The art is well acquainted with the advantages and disadvantages of use of fillers in asbestos-cement products and the various limitations which should be observed in the use of fillers. Various fillers will have a substantial affinity for water and their inclusion in the asbestos-cement compositions of this invention may affect the preferred water content of the extrusion compositions, usually causing a need for some increase in water content.

An essential component of the new extrusion compositions is asbestos. Thus, while as explained above, it is possible to extrude or otherwise plastic form compositions in which no asbestos is included this requires the use of relatively large amounts of hydromodifier and greatly and objectionably limits the range of operability as regards the water content that can be employed successfully. On the other hand, as also explained above, the presence of asbestos greatly reduces the criticality of controls required for water content and also very significantly reduces the quantity of hydromodifier required so that successful commercial operation is possible. Experience has indicated that the synergistic effects observed as apparently occurring in the presence of the asbestos and the hydromodifier are not present when the quantity of asbestos is less than about 1% by weight of the total composition. Thus, operation of the processes with less than about 1% of asbestos is not feasible. Also, tests have indicated that, for processes having generally acceptable commercial significance, the quantity of asbestos should not be less than about 3% by weight. All types and grades of asbestos fibers may be used either alone or in mixtures thereof, but chrysotile asbestos is preferred. Any of the grades of the grading system of the Quebec Asbestos Mining Association may be used. In this grading system, the higher numbers in general indicate the shorter fiber and thus, of the grades of fiber in general commercial use, grade 7 covers asbestos of the shorter fiber, with the fiber becoming longer as the grades proceed up to grade 1. The preferred water content of the new extrusion compositions is dependent to some extent upon the asbestos type and grade, slightly more water for optimum extrudability being required with the long fiber material, i.e., grade 4 asbestos requires more water than grade 6, and so on.

One noteworthy feature of this invention is the ability of the new processes to allow wider or increased use of lower cost grades of asbestos than has been practicable with prior asbestos-cement forming operations. Shorter grades of asbestos are less expensive than the longer grades and consequently, this invention makes it possible to reduce the cost of asbestos-cement products without major sacrifice in strength or other desired properties.

Other types of asbestos may be used to provide the fiber content of the new extrusion compositions, including amphobile asbestos such as crocidolite, amosite, tremolite and anthophyllite.

The combination of asbestos with hydromodifiers to produce wet forming mixtures as described in this specification is unique. Through some cooperation, either chemical or physical, which is not fully understood at this time, the presence of the asbestos in combination with the hydromodifier very substantially widens the range of water content which may be used in the wet forming mixes. This has been discussed above and is illustrated further by the data represented by the curves designated respectively Curve No. 1, Curve No. 2 and Curve No. 3 on the graph of FIG. 2. The abscissas of points on the graph indicate the amount in parts by weight of water used and the ordinates of points on the graph indicate the amount of the hydromodifier used in the extrudable compositions illustrated therein. The smallest curve, represented as a dotted line and designated Curve No. 1, in the upper left-hand corner of the graph, encloses the area representing extrudable compositions composed of silica, cement (silica to cement ratio 6:10), hydromodifier, and water. As can be seen, the amount of water which can be included in such wet mixes falls in a very narrow range, and the amount of hydromodifier which must be included in the mix is quite large. Thus, as represented by the base of Curve No. 1, at least about 2.0 parts by weight of the hydromodifier, based on 100 parts by weight of binder, must be used to obtain an extrudable composition and this in a very limited water content range.

Curve No. 2 and Curve No. 3 illustrate the unique benefit obtained by the presence of asbestos in the extrudable compositions. First, it will be observed, the presence of asbestos (10 parts by weight in the compositions represented by Curve No. 2 and 25 parts by weight in the compositions represented by Curve No. 3, both based on 100 parts by weight of binder), drops the amount of hydromodifier which must be employed to a greatly reduced level. Secondly, the asbestos very substantially widens the range of water content which may be used in forming extrudable compositions.

Since hydromodifiers are generally considerably more expensive than cement, silica, or asbestos, it is desirable to use a minimum amount of the hydromodifier in the forming mixes. Preferably, 1.5 parts by weight, based on 100 parts by weight of binder, or less of the hydromodifier should be used in order to hold the manufacturing costs at a minimum, and as can be seen from Curves No. 2 and No. 3 of FIG. 2, it is possible to operate within this range with compositions containing asbestos.

Other natural and synthetic fibers may be used with asbestos in the new extrusion compositions. These include, for example, fibers such as nylon, or glass fiber, but it has been found that the substitution of such fibers for asbestos does not provide the synergistic effect which asbestos provides in combination with hydromodifiers.

Other materials or additives may be incorporated in the asbestos-cement compositions for special purposes. For example, if a colored product is desired, dyes and pigments may be included. Similarly, cement accelerators such as lime, and cement retarders, such as a sugar solution in the case of Portland cement, may be incorporated, as is known in the art, to control the rate of setting of the cement. Also, wetting agents, flexing agents, plasticizing agents or similar additives may be used. These ingredients will be used in amounts which vary with the material and their purpose of use. This may be up to 25% or more by weight of the total extrusion composition, but usually up to 10% or less will be used. Smaller amounts, e.g., between about 1 and 5%, of materials such as wetting agents, cement accelerators or retarders and the like may be employed.

Sufficient has been said heretofore concerning water content, asbestos content, and proportions of other ingredients of the new asbestos-cement compositions to show that these proportions are somewhat interrelated. Thus, as indicated, the preferred amount of water will vary somewhat with the particular grade of asbestos which is used. Also, the cement to asbestos ratio will affect the preferred water level. It has been found that wide variations in these ranges of ingredient proportions are possible while still utilizing the novel advantages which have been discovered as a result of this invention, which come about through the use of hydromodifiers in asbestos-cement compositions. Accordingly, the extruder or other fabricator can best determine the most advantageous proportions of ingredients for any particular product which is to be formed by preparing and extruding or otherwise plastic forming a few sample wet mixes covering a range which initial study of the particular application indicates to the fabricator would probably be most satisfactory. The test procedure described above may be used for this purpose. As an aid to conducting such bracketing tests, exemplary ranges of proportions of ingredients will now be discussed.

Various methods may be used to express the proportions of ingredients or ratio of ingredients to be used in forming the novel asbesto-cement compositions of this invention. For example, the proportion of hydromodifier can be expressed as a percentage by weight of the total batch composition, this being broadly about 0.05 to 10%. Twenty percent has been found to be about the upper limit of solubility of hydromodifiers. It is possible to include more than this amount in the new compositions, but the quantity added above the upper limit of solubility appears to function primarily as merely a filler, and much less expensive materials are available for use as fillers.

One of the methods of expressing the proportions of ingredients of the composition formulations is to express the weight of hydromodifier and water (solution) as a percentage or ratio of the weight of the dry furnish to which the aqueous solution, of a given concentration of the hydromodifier, is added. Using this system of notation, dry furnish asbestos-cement compositions of the invention might be described as follows:

| Dry Furnish | Range | Example |
| --- | --- | --- |
| Cement Binder | 30 to 100% | 80% |
| Asbestos | Up to 70% | 20% |

Based on the dry furnish weight, the hydromodifier and water may be designated as the percent by weight of solution of a stated concentration added to the dry furnish. For example, if 3 parts of the hydromodifier are dissolved in 97 parts of water, this is a 3.0% solution concentration. If 100 parts of this or any other given solution concentration are added to 400 parts of dry furnish, this is expressed as 25.0% solution added. Usable solution concentrations may vary from about 0.25 to 20%, and the quantity of solution added may vary from about 20 to 110%.

As can be seen from Curve No. 2 of FIGURE 2, the amount of water added to the dry furnish will depend in part upon the amount of hydromodifier which is included in the forming composition. Larger amounts of hydromodifier widen the range of water which can be used. Broadly, the water content can be varied from about 14–50% by weight of the asbestos-cement wet mix. The wet mixes used in the formulations of the instant invention are not similar in any degree to those fluid compositions such as pourable or pumpable cement slurries which are used for making concrete structures, cementing oil wells or the like and which slurries are essentially suspensions or the like of solids in liquids, and it is not practicable to test or describe their properties in the terms of viscosity or other similar types of physical measurement. In the preferred formulations, these wet mixes are moist to the touch and comprise particulate material agglomerated to form discernible pellets of varying size which are readily compactible and, when so compacted, adhere together to form self-sustaining masses (e.g. preform pugs for handling to an extruder) of tractable consistency. The operable formulations from those with the high water content to those with the low water content, vary quite considerably in their physical characteristics. The asbestos-cement mixes of the instant invention which have the higher water content may be described as similar to a soft modeling clay which is moist to the touch, plastic but not fluid. Although readily extrudable when subjected to operating pressure, the asbestos-cement mixes having the higher water content are shape retaining and self supporting and evidence substantially no flow characteristic when non-supported. At the other extreme the asbestos-cement mixtures of the instant invention, having the lower water, content, may be described as similar to a dry, whiting-linseed oil putty, which is substantially dry to the touch, possessing sufficient rigidity to be broken and which when broken does not elongate or stretch out at the break. The mixtures in the lower water content range are characteristically dry to the touch and in the form of small, stiff pellets, comprising rather crumbly particulate material, and are not readily compacted into preform shapes. From the foregoing description, it will be noted that all of the asbestos-cement mixtures which may be plastic-formed in accordance with the instant invention may be descibed as plastic, tractable mixtures having shape-retaining characteristics.

Another method of expressing total batch compositions of this invention is to base the quantity of other ingredients on the amount of hydraulic cement binder by weight. Using this system of notation, it is possible to described preferred compositions of the invention as follows:

| By Weight of the Binder Ingredients | Parts by Weight | |
| --- | --- | --- |
|  | Range | Example |
| Binder consisting of 62.5:37.5 mix of cement: silica | 100 | 100 |
| Asbestos | Up to 235 | 25 |
| Hydromodifier | 0.1 to 80 | 1 |
| Water | 18 to 350 | 30 |

Still another method of describing the new compositions is by specifying the amount of each ingredient as a percentage by weight of the total composition. The majority of compositions of the invention using this system of notation could be designated as follows:

| By Weight of the Total Composition Ingredients | Percent By Weight | |
| --- | --- | --- |
| | Range | Preferred |
| Hydraulic cement | 10 to 85 | 20 to 70. |
| Auxiliary cementing agent | Up to 55 | Up to 40. |
| Asbestos | Up to 60 | 5 to 40. |
| Filler, pigments or like | Up to 25 | Up to 10. |
| Hydromodifier | 0.05 to 10 | 0.1 to 5. |
| Water | 14 to 50 | 18 to 35. |

The mixing and handling of the new compositions prior to extrusion or other mechanical plastic forming may be carried out in a variety of ways. Generally, it is advisable to form a dry furnish, i.e., mixture, of all dry ingredients as a preliminary step in the operation. However, if special mixing or conveying equipment is available, it is possible to mix the hydraulic cement, auxiliary cementing agent, asbestos fiber, hydromodifier, water and other ingredients, if any, together all at once and pass this mixture immediately to the extruding or other mechanical forming equipment. This type of arrangement can be used to provide a completely continuous operation in which the individual ingredients for the final asbestos-cement product are charged into suitable hoppers or containers in the equipment line, from which they are discharged by suitable weighing or measuring devices into a continuous mixer and thence to the extruder or other plastic forming equipment.

Many of the hydromodifiers can be mixed with the dry ingredients to form a dry premix and this type operation may be desirable where facilities or equipment are not available for handling and preparing large quantities of aqueous solutions of the hydromodifiers. However, the dry premix procedure is not applicable to all of the hydromodifiers, since some of them cannot be suitably dissolved or dispersed in water in the presence of the hydraulic cement or within the relatively short period of time which is available before the cement starts to set up in the presence of water. Gelatin, glue and polyvinyl alcohol are examples of hydromodifiers which are not amendable to dry premixing.

Various types of dry mixers can be employed in forming the dry furnish, e.g., rotating arm mixers, rotary tumbling mixers, beater mixers, air-suspension mixers or the like. The dry mixing should be carried out for a sufficient length of time to insure the formation of a uniform dry furnish, usually between about 1 to 15 minutes.

The wet mixing step is necessary to incorporate the water into the composition. As previously indicated, this can also be used to incorporate the hydromodifier by dissolving the hydromodifier in a suitable quantity of water to form a solution which is mixed with the dry furnish. Vigorous mixing conditions are recommended for this wet mixing step in order to insure thorough and intimate distribution of the water or aqueous solution with the other components of the composition. Sigma-blade mixers, pug mills and similar high shear mixing equipment are useful for the wet mixing step. Obviously, the wet mixing should not be carried out for too long a time because this could cause the cement to begin to set before the composition is introduced into the extruder. Usually about two minutes to one hour of wet mixing is preferable with commercially available wet mixing equipment, depending upon the type used. The use of continuous mixers for the wet mixing step opens upon the possibility, as pointed out above, of eliminating the dry mixing step, of using continuous dry mixers, and of decreasing the time required for wet mixing. Also, this type of continuous wet mixing may offer advantages when cement accelerators are to be included in the extrusion compositions since the accelerator can be injected into the mixture at the last possible moment, so that premature setting of the composition can be avoided.

Broken-screw type mixers, such as the "Ko Kneader" manufactured by Baker-Perkins Company, have been found particularly useful in wet mixing the asbestos-cement compositions. Using this equipment, or any other suitable piece of equipment, the optimum mixing conditions are best determined by forming the extrusion compositions under varying mixing times and other conditions, extruding the resulting mixtures and testing the resulting products, and then using those mixing conditions which give final products of maximum strength and/or other desired properties.

After the wet mixing is completed, it may be desirable to subject the moist extrusion composition to a de-airing step, although this is not essential. The de-airing is best accomplished by placing the extrusion composition in a container and drawing a vacuum, or by continuously passing a stream of the moist extrusion material into a zone of reduced pressure through suitable inlet and outlet valves or openings. De-airing equipment of this type is readily available.

One of the noteworthy features of the new invention is the fact that it makes it possible to extrude asbestos-cement compositions with standard, readily available extrusion equipment, using pressures of an order normally used in such equipment. In other words, it is not necessary to use special and complicated equipment in order to accomplish successful extrusion of the new compositions of this invention. Thus, most of the standard forms of ram or screw extruders may be employed. The ram extruders are useful because they permit a broader range of ingredients to be used in the extrusion operations, but they have the disadvantage of operating primarily in a batch-type fashion. Screw extruders have the advantage of providing for continuous operation. Regardless of the form of extrusion equipment which is used, it should include some suitable arrangement for prompt cleaning after extrusion is completed because the asbestos-cement compositions will set up, and if allowed to remain in the extruder too long, may require the use of chisels, air hammers or the like in order to free the extruder of the hardened material.

The structures which are obtained upon the extrusion of the new asbestos-cement compositions are generally shape-retaining. Of course, since they are still in the uncured state where they can be quite easily bent or deformed by the application of pressure, the uncured extruded structures desirably should be supported against deformation until sufficiently cured to withstand deforming pressure.

Curing of the extruded products may be accomplished under any conditions known to be useful for setting the cement to form final products of high strength. One curing method, used where Portland cement is employed, is to store the extruded structure at room temperature under highly humid conditions for about 7 to 30 days. Another method used where Portland cement is employed is to steam cure the extruded product in an autoclave under pressure of saturated steam at 100 p.s.i.g. for about 12 to 20 hours.

In addition to their use in extrusion operations, asbestos-cement compositions containing hydromodifiers may also be used in molding operations. Standard molding equipment may be used in forming the new compositions, but since the hydromodifiers eliminate or mitigate the dewatering problem, it is possible to mold asbestos-cement structures having deeper or more involved contours than has been possible heretofore. Furthermore, in carrying out the molding operations in accordance with this invention, it is not necessary to place the molding composition so carefully in the mold and level it off, as has heretofore been necessary in order to insure that only a minimum amount of flow would be required when the mold was closed and pressure was applied, to obtain the desired product. Thus, molding materials formed of the new compositions containing the hydromodifiers will flow into offsets and around sharp corners or turns and the like without separation of water or stratification of the molding composition, to produce products having, if desired, substantially uniform density throughout. Moreover, it is now possible, using the new techniques provided by this invention, to mold shapes and configurations of asbestos-cement compositions not possible heretofore.

The following is a description of the formulation and the procedure used for producing a desired type of commercial product in accordance with the disclosure of the instant application.

Raw materials:
"Pioneer National" Type I Portland cement
"New Jersey Silex"
Canadian Chrysotile 4T Fiber (4T30 1 x willowed)
"Polyox WSR 301"

Formulation:
By weight of the total composition system:

| | Percent |
|---|---|
| Asbestos fiber (4T30) | 11.5 |
| Cement | 40.9 |
| Silica | 24.5 |
| Water | 22.8 |
| "Polyox WSR 301" | 0.3 |
| | 100.0 |

By weight of the binder system:

| | Parts |
|---|---|
| Binder (cement:silica=62.5:37.5) | 100.00 |
| Asbestos fiber (4T30) | 17.65 |
| Water | 34.84 |
| "Polyox WSR 301" | 0.46 |
| | 152.95 |

Dry furnish system:

| | Percent |
|---|---|
| Dry furnish: | |
| Asbestos fiber (4T30) | 15.0 |
| Cement | 53.1 |
| Silica | 31.9 |
| | 100.0 |
| Solution added | 30.0 |
| Solution concentration | 1.3 |

Procedure:
At batch, consisting of:

| | Pounds |
|---|---|
| Fiber | 75 |
| Cement | 265 |
| Silica | 160 |
| "Polyox WSR 301" | 2 |
| | 502 | was mixed for 5-min. in a ribbon-type mixer and then placed in a Baker-Perkins sigma blade mixer having a working capacity of 100-ga. One hundred and fifty (150) pounds of water were added, and the materials were wet mixed for 15 min. The resulting wet mixture was then fed to a standard auger extruder having a 12⅝-in. screw and was extruded through a die to form a multi-channel conduit or multi-duct.

The extruded product was air cured for 24-hrs. and then steam cured for 16-hrs. in an atmosphere of saturated steam at 100 p.s.i.g.

The multi-duct conduit formed as described above had a rectangular cross section approximately 4¼-in. high and 12 in. wide containing three equally spaced 3½-in. diameter holes. The cured product had a normal weight of approximately 17-lb. per linear foot and a dry density of approximately 102-lb./cu.ft.

The multi-duct described above was subjected to the following tests:

*Crush test.*—Five 2-ft. lengths of the cured product were bedded in sand and subjected to a uniform crushing or compressive load applied to the sample through sand. The average load obtained before crushing failure was 35,500-lb. per ft. with a range from 34,000 to 37,500-lb. per ft.

*Flexure test.*—Two 10-ft. lengths of the cured product were tested in flexure on a 9-ft. span with third point loading. The average load was 2500-lb. The average modulus of rupture was 1600 p.s.i. and the average modulus of elasticity $2.16 \times 10^6$ p.s.i.

*Conclusion*

There has been described in the foregoing specification the preparation of new asbestos-cement compositions which include small amounts of hydromodifiers which alter the characteristics of the asbestos-cement mixtures so that they can be successfully shaped by extrusion, molding, or other plastic forming means without undergoing the "dewatering" which has invariably been associated with such processing of asbestos-cement compositions known heretofore. As a result, it is now possible to extrude in a commercially feasible manner such common items as pipe, boards, shingles, tapered building siding, and the like from asbestos-cement mixtures. Moreover, it is possible to form such structures as multi-channel or multi-duct telephone conduits, hollow building tile and other complex shapes that could not be formed prior to this invention from asbestos-cement compositions.

In addition to opening up an entirely new avenue for the commercial forming of asbestos-cement compositions, this invention also makes it possible to obtain greater latitude in the controlled density and strength of asbestos-cement products. These new procedures can be very advantageously utilized to produce high density products, e.g., products having a density of about 100–135 lbs./c.f. At the same time, because of the wider latitude in water content of the forming compositions made possible by the use of hydromodifiers, it is also possible to produce products of substantially lower density. These can have for example, a density of 50 lbs./c.f. or less, so that products with a density ranging between about 50 and about 125 lbs./c.f. are contemplated using the forming techniques of this invention.

Another advantage obtained by the invention is the ability to utilize more fully less expensive grades of asbestos than have been acceptable with the commercial procedures known heretofore for forming shaped structures of asbestos-cement.

A complete description of the invention and a description of the best mode contemplated of carrying out the invention have been provided in such manner as to distinguish it from other inventions and from what is old; the scope of patent protection to be accorded the invention, however, is defined by the following claims.

What we claim is:

1. A method of producing good quality, shaped, cured, asbestos-cement products, said method comprising:
   (a) providing an uncured mixture comprising:

| | Approximate Percent by Weight |
|---|---|
| (1) hydraulic cement | 10–85 |
| (2) water | 14–50 |
| (3) hydromodifier | 0.05–10 |
| (4) asbestos | 3–60 |
| (5) auxiliary cementing agent | 0–55 |
| (6) other conventional hydraulic cement composition ingredients | 0–25 | and the proportionate amounts being such as to cause said mixture to be a plastic, tractable mixture having shape-retaining characteristics; that it, a mixture being, in the proportionately higher water content ranges, moist to the touch, plastic but not fluid, shape-retaining, self-supporting, and evidencing substantially no flow characteristics when non-supported, and being, in the proportionately lower water content ranges, substantially dry to the touch while being plastic and tractable, possessing sufficient rigidity to be broken and when broken not elongating at the break, characteristically being in the form of small stiff pellets, comprising rather crumbly particulate material, and not being readily compacted into preform shapes; and said mixture having enhanced plastic flow characteristics and capacity for resisting dewatering under relatively high pressures so as to enable the mixture to flow and prevent the separation of an appreciable amount of water from the mixture when the mixture is subjected to pressures of considerable magnitude such as are normally developed in conventional plastic forming operations exemplified by those employing conventional ram and auger extruders;

(b) plastic forming said mixture under pressure of the order described in subparagraph (a) above without separating an appreciable amount of water from said mixture to produce a shaped body that is generally shape retaining; and (c) subjecting said shaped body to hydraulic cement curing conditions to cure said cement and impart strength to the resulting product.

2. A method as defined in claim 1, in which:
(a) said hydraulic cement comprises Portland cement;
(b) said auxiliary cementing agent comprises silica present in significant amount; and
(c) said hydraulic cement curing conditions comprise steam curing conditions for said Portland cement and silica.

3. A method as defined in claim 2, in which said plastic forming is extruding through an extrusion die.

4. A method as defined in claim 1, in which:
(a) said hydraulic cement comprises Portland cement;
(b) said plastic forming is extruding through an extrusion die; and
(c) said hydraulic cement curing conditions comprise Portland cement curing conditions.

5. A method as defined in claim 1, in which:
(a) said hydraulic cement comprises Portland cement;
(b) said plastic forming is molding; and
(c) said hydraulic cement curing conditions comprise Portland cement curing conditions.

6. A method as defined in claim 1, in which the approximate ranges of percentages of the ingredients by weight, are as follows:

| | Approximate Percent by Weight |
|---|---|
| (1) hydraulic cement | 20–70 |
| (2) water | 18–36 |
| (3) hydromodifier | 0.1–5 |
| (4) asbestos | 5–40 |
| (5) auxiliary cementing agent | 0–40 |
| (6) other conventional hydraulic cement composition ingredients | 0–10 |

7. A method as defined in claim 6, in which said plastic forming is extruding through an extrusion die.

8. A product produced by the method of claim 1.

References Cited by the Examiner

UNITED STATES PATENTS

| | | | |
|---|---|---|---|
| 1,835,245 | 12/1931 | Shipley | 138—111 |
| 1,970,921 | 8/1934 | Schneider | 106—91 |
| 1,977,158 | 10/1934 | Thurman et al. | 106—99 |
| 2,779,417 | 1/1957 | Clark et al. | 106—93 |
| 2,934,932 | 5/1960 | Wagner | 106—93 |
| 2,963,905 | 12/1960 | Kabelitz | 73—150 |
| 2,978,782 | 4/1961 | Wagner | 106—93 |
| 3,008,843 | 11/1961 | Jolly | 106—90 |
| 3,030,258 | 4/1962 | Wagner | 106—93 |
| 3,053,081 | 9/1962 | Raschig et al. | 73—150 |

FOREIGN PATENTS 590,643  7/1947  Great Britain.

TOBIAS E. LEVOW, *Primary Examiner.*

JOSEPH REBOLD, *Examiner.*

UNITED STATES PATENT OFFICE
CERTIFICATE OF CORRECTION

Patent No. 3,219,467                                November 23, 1965

Francis W. Redican et al.

It is hereby certified that error appears in the above numbered patent requiring correction and that the said Letters Patent should read as corrected below.

Column 5, line 71, for "froming" read -- forming --; column 6, line 30, for "invetion" read -- invention --; column 10, line 1, for "(e)" read -- (1) --; Columns 9 and 10, Table A., second line in the heading, for "Type T" read -- Type I --; same table, item 7, for '"Swift #10"' read -- "Swift #410" --; columns 11 and 12, TABLE E., item 12, for "Clarboxy" read -- Carboxy --; same table, item 15, for '"Keltax"' read -- "Keltex" --; same columns, TABLE B., item 10, for "strach" read -- starch --; columns 13 and 14, TABLE D., in the heading, for "(LUMINTE)" read -- (LUMNITE) --; column 15, line 62, for "0.4" read -- 0.24 --; column 18, TABLE F., item 20, for '"Juguar 507"' read -- "Jaguar 507" --; column 26, line 37, for "("Methocel 60HG 400")" read -- ("Methocel 60HG 4000") --; column 29, line 46, for "asbesto-cement" read -- asbestos-cement --; column 30, line 59, for "described" read -- describe --; column 31, line 45, for "amendable" read -- amenable --; column 31, line 69, for "upon" read -- up --; column 36, line 12, for "18-36" read -- 18-35 --.

Signed and sealed this 27th day of September 1966.

(SEAL)
Attest:

ERNEST W. SWIDER                                     EDWARD J. BRENNER
Attesting Officer                                    Commissioner of Patents